(12) United States Patent
Powell et al.

(10) Patent No.: US 8,324,316 B2
(45) Date of Patent: Dec. 4, 2012

(54) UNSATURATED POLYESTER RESIN COMPOSITIONS CONTAINING 2,2,2,4-TETRAMETHYL-1,3-CYCLO-BUTANEDIOL AND ARTICLES MADE THEREFROM

(75) Inventors: Jeffery Earl Powell, Blountville, TN (US); Angela Hartley Honeycutt, Johnson City, TN (US)

(73) Assignee: Eastman Chemical Company, Kingsport, TN (US)

( * ) Notice: Subject to any disclaimer, the term of this patent is extended or adjusted under 35 U.S.C. 154(b) by 739 days.

(21) Appl. No.: 12/367,133

(22) Filed: Feb. 6, 2009

(65) Prior Publication Data
US 2010/0204413 A1 Aug. 12, 2010

(51) Int. Cl.
*C08G 63/48* (2006.01)
*C08G 63/16* (2006.01)
*C08F 283/01* (2006.01)

(52) U.S. Cl. .......... 525/39; 525/418; 525/437; 528/300; 528/302; 528/303; 528/308; 528/308.6; 528/308.8

(58) Field of Classification Search .................. 525/437; 528/300, 302, 303, 304, 306, 308, 297, 274
See application file for complete search history.

(56) References Cited

U.S. PATENT DOCUMENTS

| | | |
|---|---|---|
| 2,891,930 A | 6/1959 | Caldwell et al. |
| 3,227,764 A | 1/1966 | Martin et al. |
| 3,313,777 A | 4/1967 | Elam et al. |
| 3,345,313 A | 10/1967 | Ruhf et al. |
| 3,484,339 A | 12/1969 | Caldwell |
| 3,502,620 A | 3/1970 | Caldwell |
| 3,538,187 A | 11/1970 | Feltzen |
| 3,789,044 A | 1/1974 | Taft et al. |
| 3,856,830 A | 12/1974 | Kuehn |
| 4,074,061 A | 2/1978 | Musser |
| 4,076,766 A | 2/1978 | Simms |
| 4,267,279 A | 5/1981 | Howell |
| 4,299,933 A | 11/1981 | McConnell et al. |
| 4,322,508 A | 3/1982 | Peng et al. |
| 4,338,379 A | 7/1982 | Strolle et al. |
| 4,350,807 A | 9/1982 | McConnell et al. |
| 4,363,908 A | 12/1982 | Joyner et al. |
| 4,397,989 A | 8/1983 | Adesko |
| 4,480,077 A | 10/1984 | Hefner, Jr. |
| 4,525,504 A | 6/1985 | Nelson et al. |
| 4,525,544 A | 6/1985 | Morris et al. |
| 4,581,093 A | 4/1986 | Noyes et al. |
| 4,585,854 A | 4/1986 | Tung et al. |
| 4,698,391 A | 10/1987 | Yacobucci et al. |
| 4,716,200 A | 12/1987 | Berghoff |
| 4,724,173 A | 2/1988 | Rockett et al. |
| 4,737,551 A | 4/1988 | Dervan et al. |
| 4,751,267 A | 6/1988 | Berghoff |
| 4,859,760 A | 8/1989 | Light, Jr. et al. |
| 4,910,292 A | 3/1990 | Blount |
| 4,939,233 A | 7/1990 | Jenkins et al. |
| 4,959,259 A | 9/1990 | Guilbaud |
| 5,017,679 A | 5/1991 | Chang et al. |
| 5,023,367 A | 6/1991 | Calbo, Jr. et al. |
| 5,025,086 A * | 6/1991 | Blount et al. .................. 528/272 |
| 5,097,006 A * | 3/1992 | Kapilow et al. ................ 528/272 |
| 5,124,388 A | 6/1992 | Pruett et al. |
| 5,160,792 A | 11/1992 | Barbee et al. |
| 5,245,002 A | 9/1993 | Kuo |
| 5,254,637 A | 10/1993 | Witzeman et al. |
| 5,256,759 A | 10/1993 | Kuo |
| 5,256,761 A | 10/1993 | Blount, Jr. |
| 5,306,567 A | 4/1994 | Kuo et al. |
| 5,344,872 A | 9/1994 | Debord et al. |
| 5,349,026 A | 9/1994 | Emmons et al. |
| 5,371,148 A | 12/1994 | Taylor et al. |
| 5,393,609 A | 2/1995 | Chang et al. |
| 5,393,840 A | 2/1995 | Kuo |
| 5,397,641 A | 3/1995 | Moens et al. |
| 5,416,187 A | 5/1995 | Kuo et al. |
| 5,439,988 A | 8/1995 | Moens et al. |
| 5,464,909 A | 11/1995 | Chang et al. |
| 5,498,668 A | 3/1996 | Scott |
| 5,554,701 A | 9/1996 | Chang et al. |
| 5,596,037 A | 1/1997 | Moens et al. |
| 5,646,237 A | 7/1997 | George et al. |
| 5,852,120 A | 12/1998 | Bederke et al. |
| 5,955,565 A * | 9/1999 | Morris et al. .................. 528/271 |
| 6,087,464 A | 7/2000 | Swarup et al. |

(Continued)

FOREIGN PATENT DOCUMENTS
BE 615850 7/1962
(Continued)

OTHER PUBLICATIONS

Copending U.S. Appl. No. 12/367,113, filed Feb. 6, 2009.
Copending U.S. Appl. No. 12/367,151, filed Feb. 6, 2009.
Copending US. Appl. No. 12/367,190, filed Feb. 6, 2009.
Copending U.S. Appl. No. 12/367,202, filed Feb. 6, 2009.
USPTO Office Action dated Aug. 20, 2010 for U.S. Appl. No. 12/367,113.
USPTO Office Action dated Aug. 20, 2010 for U.S. Appl. No. 12/367,202.
USPTO Office Action dated Nov. 30, 2010 for U.S. Appl. No. 12/367,190.

(Continued)

*Primary Examiner* — Ling Choi
*Assistant Examiner* — Chun-Cheng Wang
(74) *Attorney, Agent, or Firm* — Jennifer R. Knight; Eric Middlemas

(57) ABSTRACT

Disclosed are unsaturated polyester resins comprising residues of 1,2-propanediol, 2,2,4,4-tetramethyl-1,3-cyclobutanediol, an aliphatic, cycloaliphatic, or aromatic diacid, and 2-butenedioic acid. Also disclosed are curable compositions containing admixtures of the unsaturated polyesters and aromatic vinyl compounds copolymerizable with the unsaturated polyesters, and coatings and casted and molded articles obtained from the curable compositions. The curable compositions are useful for coatings and casted and molded articles that have at least one surface that is persistently exposed to organic or aqueous liquids.

20 Claims, No Drawings

U.S. PATENT DOCUMENTS

| | | | |
|---|---|---|---|
| 6,120,851 | A | 9/2000 | Borgholte et al. |
| 6,248,843 | B1 | 6/2001 | Panandiker et al. |
| 6,265,072 | B1 | 7/2001 | Fagerburg |
| 6,423,816 | B1* | 7/2002 | Wamprecht et al. .......... 528/302 |
| 6,887,937 | B1 | 5/2005 | Vandevoorde et al. |
| 6,992,133 | B2 | 1/2006 | Yokoyama et al. |
| 6,995,194 | B2 | 2/2006 | Moens et al. |
| 7,087,672 | B2 | 8/2006 | Yuan et al. |
| 7,141,625 | B2 | 11/2006 | Komazaki et al. |
| 2001/0051706 | A1 | 12/2001 | George et al. |
| 2002/0103329 | A1 | 8/2002 | Koldijk et al. |
| 2004/0024140 | A1 | 2/2004 | Fujita et al. |
| 2006/0079650 | A1 | 4/2006 | Stevenson et al. |
| 2006/0286383 | A1 | 12/2006 | Gilmer |
| 2007/0020557 | A1 | 1/2007 | Yao et al. |
| 2007/0092746 | A1 | 4/2007 | Wayton et al. |
| 2007/0232778 | A1 | 10/2007 | Moody et al. |
| 2008/0139687 | A1 | 6/2008 | Woods et al. |

FOREIGN PATENT DOCUMENTS

| | | |
|---|---|---|
| EP | 1647564 | 4/2006 |
| GB | 1044015 | 9/1966 |
| GB | 1130558 | 10/1968 |
| WO | 9412557 | 6/1994 |
| WO | 9501407 | 1/1995 |
| WO | 9633229 | 10/1996 |
| WO | 2006083343 | 8/2006 |
| WO | 2006138198 | 12/2006 |
| WO | 2007078851 | 7/2007 |

OTHER PUBLICATIONS

USPTO Office Action dated Nov. 30, 2010 for U.S. Appl. No. 12/367,151.
USPTO Office Action dated Dec. 21, 2010 for U.S. Appl. No. 12/367,113.
International Search Report and Written Opinion for PCT/US2010/000212 dated Apr. 7, 2010.
International Search Report and Written Opinion for PCT/US2010/000213 dated Apr. 8, 2010.
International Search Report and Written Opinion for PCT/US2010/000214 dated Apr. 7, 2010.
International Search Report and Written Opinion for PCT/US2010/000215 dated Apr. 7, 2010.
International Search Report and Written Opinion for PCT/US2010/000216 dated Mar. 19, 2010.
USPTO Office Action dated Mar. 7, 2011 for U.S. Appl. No. 12/367,202.
USPTO Office Action dated Mar. 18, 2011 for U.S. Appl. No. 12/367,151.
USPTO Office Action dated Mar. 21, 2011 for U.S. Appl. No. 12/367,190.
USPTO Office Action dated Jun. 23, 2011 for U.S. Appl. No. 12/367,202.
USPTO Office Action dated Jun. 24, 2011 for U.S. Appl. No. 12/367,113.
USPTO Office Action dated Nov. 7, 2011 for U.S. Appl. No. 12/367,202.
USPTO Office Action dated Nov. 18, 2011 for U.S. Appl. No. 12/367,113.
USPTO Notice of Allowance dated Dec. 19, 2011 for U.S. Appl. No. 12/367,202.
USPTO Notice of Allowance dated Jan. 10, 2012 for U.S. Appl. No. 12/367,113.
Copending U.S. Appl. No. 13/418,584, filed Mar. 13, 2012.
Copending U.S. Appl. No. 13/435,347, filed Mar. 30, 2012.
USPTO Office Action dated Jun. 15, 2012 for U.S. Appl. No. 13/418,584.
Heidt, et al., "Florida weathering of Isophthalic Acid-Based, Melamine-Crosslinked Polyester Coatings", Proceedings of the Twenty-Seventh International Waterborne, High-Solids and Powder Coatings Symposium, (2000), pp. 295-307.
Anonymous, "The Use of Cycloaliphatic Diacids and Anhydrides as Monomers for Polyester Polymers to Improve their Compatibility with Acrylic Polymners", Research Disclosure, 360, (1994), pp. 229-230.
Husbands, M.J., et al. "Polyester Resins", A Manual of Resins for Surface Coatings, vol. III, pp. 63-167.
Wicks, Zeno Jr., et al., "Polyester Resins", Organic Coatings Science and Technology, $2^{nd}$ ed.,13, (1999), pp. 246-257.
Oldring, P.K.T., et al., "Vinyl and Acrylic Monomners", A Manual of Resins for Surface Coatings, vol. II, pp. 121-210.
Seo, Kab S., et al., "Drying Characteristics and Rheology of Carboxymethylcellulose Acetate Butyrate in Waterborne Coatings", Proceedings of the Thirty First International Waterborne, High-Solids, and Powder Coatings Symposium (2004), pp. 221-236.
Jorissen, D.A., et al., "Higher Solids Polyurethane Coatings", Proceedings of the International Waterborne, High-Solids and Powder Coatings Symposium (1992), $19^{th}$ ed. pp. 182-195.
Ni, Hai, et al.; "Cycloaliphatic Polyester Based High Solids Polyurethane Coatings: I. The Effect of Difunctional Alcohols"; Journal of Coatings Technology, vol. 74, No. 928, (2002), pp. 49-56.
Vandevoorde, P., et al. Making solid gains Novel acrylic and polyester polyols reduce VOCs in solventborne urethanes, European Coatings Journal (2005) (9) pp. 22-24, 26-29.
Wicks, Zeno Jr., et al. "Powder Coatings", Organic Coatings Science and Technology, $2^{nd}$ ed. (1999), pp. 256, 486-487.
"Coating Processes (Powder Technology)", Kirk-Othmer Encyclopedia of Chemical Technology, $4^{th}$ Ed., vol. 6, pg. 641.

* cited by examiner

UNSATURATED POLYESTER RESIN COMPOSITIONS CONTAINING 2,2,2,4-TETRAMETHYL-1,3-CYCLOBUTANEDIOL AND ARTICLES MADE THEREFROM

FIELD OF THE INVENTION

This invention pertains to certain novel unsaturated polyester resins which may be polymerized with a vinyl aromatic compound to produce coatings and casted and molded articles which possess osmotic blister resistance. More particularly, this invention pertains to unsaturated polyester resins based on residues of 2-butenedioic acid, 2,2,4,4-tetramethyl-1,3-cyclobutanediol, and 1,2-propanediol.

BACKGROUND OF THE INVENTION

Unsaturated polyester resins are used to make composite (i.e., fiber reinforced plastic or FRP) structures. A component of some composite structures known as gel coat is commonly used to provide protection and beautification of the overall composite structure. The majority of gel coats are based on linear, unsaturated polyesters derived from maleic anhydride, diacids such as adipic acid, isophthalic acid and phthalic anhydride, and diols such as 1,2-propanediol and 2,2-dimethyl-1,3-propanediol. The unsaturated polyester resin is typically dissolved in and copolymerized with a ethylenically unsaturated monomer, i.e., styrene, to form the final cured resin. Varying degrees of UV weathering and water resistance (i.e., osmotic blister resistance) may be obtained by carefully selecting the types and ratios of monomers and processing them to a particular molecular weight or other parameter using techniques that are well known to polymer chemists. Alternatively, additives may be included in the resin to improve its UV weathering or water resistance.

The preparation of gel coats with good osmotic blister resistance in combination with other desirable properties has been difficult. For example, good osmotic blister resistance can be obtained by incorporating aromatic diacids such as, for example, isophthalic acid (abbreviated herein as "IPA") into the unsaturated polyester resin gel coat. Aromatic molecules adsorb UV energy, however, and gel coats with high aromatic content can experience accelerated loss of specular gloss and increase yellowing upon UV exposure. Substituting various aliphatic dicarboxylic acids for IPA can improve UV weathering, but generally reduces osmotic blister resistance and often may cause poor polymer solubility in styrene. Solubility in styrene is needed for proper application and cure of the final composite part. New, unsaturated polyester resins are needed, therefore, that provide good UV weathering properties in conjunction with osmotic blister resistance.

SUMMARY OF THE INVENTION

We have discovered a class of unsaturated polyester resins which produce gel coat resins with improved osmotic blister resistance while maintaining good styrene solubility prior to polymerization. Our invention, therefore, provides an unsaturated polyester resin, comprising:

A. diacid residues, comprising about 10 to about 90 mole percent of the residues of at least one diacid chosen from 1,4-cyclohexanedicarboxylic acid, 1,2-hexahydrophthalic acid, isophthalic acid, terephthalic acid, phthalic acid, and 1,3-cyclohexanedicarboxylic acid, based on the total moles of diacid residues, and about 90 to about 10 mole percent of the residues of 2-butenedioic acid; and B. diol residues, comprising about 20 to about 90 mole percent of the residues of 2,2,4,4-tetramethyl-1,3-cyclobutanediol and about 80 to about 10 mole percent of the residues of 1,2-propanediol, based on the total moles of diol residues;

wherein the polyester has a number average molecular weight of about 300 to about 10,000 daltons; a glass transition temperature of about 0 to about 125° C.; an acid number of 0 to about 50 mg KOH/g of polyester resin; and a ICI viscosity of about 5 to about 70 poise at a temperature of 175 to 200° C.

In addition to unsaturated polyester resins, our invention also provides curable unsaturated polyester compositions comprising:

I. an unsaturated polyester resin, comprising:
  A. diacid residues, comprising about 10 to about 90 mole percent of the residues of at least one diacid chosen from 1,4-cyclohexanedicarboxylic acid, 1,2-hexahydrophthalic acid, isophthalic acid, terephthalic acid, phthalic acid, and 1,3-cyclohexanedicarboxylic acid, based on the total moles of diacid residues, and about 90 to about 10 mole percent of the residues of 2-butenedioic acid; and
  B. diol residues, comprising about 20 to about 90 mole percent of the residues of 2,2,4,4-tetramethyl-1,3-cyclobutanediol and about 80 to about 10 mole percent of the residues of 1,2-propanediol, based on the total moles of diol residues;
  wherein the polyester has a number average molecular weight of about 300 to about 10,000 daltons; a glass transition temperature of about 0 to about 125° C.; an acid number of 0 to about 15 mg KOH/g of polyester resin; and a ICI viscosity of about 5 to about 70 poise; and
II. an ethylenically unsaturated monomer copolymerizable with the unsaturated polyester resin.

The curable, unsaturated polyester compositions may be used for the preparation of cast or molded articles. In particular, the unsaturated coating compositions are useful for cast or molded articles which have at least one surface that is persistently exposed to organic or aqueous liquids.

Yet another aspect of our invention is a process for the preparation of the above unsaturated polyester resins, comprising:

I. heating a mixture comprising:
  A. a diacid component, comprising about 10 to about 90 mole percent of at least one diacid chosen from 1,4-cyclohexanedicarboxylic acid, 1,2-hexahydrophthalic acid, isophthalic acid, terephthalic acid, phthalic acid, and 1,3-cyclohexanedicarboxylic acid, based on the total moles of diacid in steps I and II; and
  B. a diol component comprising about 20 to about 90 mole percent of 2,2,4,4-tetramethyl-1,3-cyclobutanediol and about 80 to about 10 mole percent of 1,2-propanediol, based on the total moles of diol;
  while removing the water of esterification to form an intermediate polymerization product; and
II. heating the intermediate polymerization product and about 90 to about 10 mole percent of one or more of a 2-butenedioic acid, an ester thereof, or an anhydride thereof, based on the total moles of diacid in steps I and II, while removing the water of esterification to form an unsaturated polyester resin, wherein the unsaturated polyester resin has a number average molecular weight of about 300 to about 10,000 daltons; a glass transition temperature of about 0 to about 125° C.; an acid number of 0 to about 50 mg KOH/g of polyester resin; and a ICI viscosity of about 5 to about 70 poise at a temperature of 175 to 200° C. Our process reduces the decomposition of 2,2,4,4-tetramethyl-1,3-cyclobutanediol that can occur during the preparation of unsaturated polyester resins at elevated temperatures.

DETAILED DESCRIPTION

The unsaturated polyester resin of the present invention comprises diacid residues comprising about 10 to about 90 mole percent of the residues of at least one diacid chosen from 1,4-cyclohexanedicarboxylic acid, 1,2-hexahydrophthalic acid, isophthalic acid, terephthalic acid, phthalic acid, and 1,3-cyclohexanedicarboxylic acid, based on the total moles of diacid residues, and about 90 to about 10 mole percent of the residues of 2-butenedioic acid; and diol residues, comprising about 20 to about 90 mole percent of the residues of 2,2,4,4-tetramethyl-1,3-cyclobutanediol and about 80 to about 10 mole percent of the residues of 1,2-propanediol. The unsaturated polyester resins have a number average molecular weight of about 300 to about 10,000 daltons; a glass transition temperature of about 0 to about 125° C.; an acid number of 0 to about 50 mg KOH/g of polyester resin; and a ICI viscosity of about 5 to about 70 poise at a temperature of 175 to 200° C. The unsaturated polyesters are useful for preparing manufactured articles such as sanitary ware, electronic circuit boards, UV cure products, coatings, inks, and infrastructure components. They are particularly useful for composite structures persistently exposed to water such as, for example, water tanks, pipes, and boat hulls.

Unless otherwise indicated, all numbers expressing quantities of ingredients, properties such as molecular weight, reaction conditions, and so forth used in the specification and claims are to be understood as being modified in all instances by the term "about." Unless indicated to the contrary, the numerical parameters set forth in the following specification and attached claims are approximations that may vary depending upon the desired properties sought to be obtained by the present invention. At the very least, each numerical parameter should be construed in light of the number of reported significant digits and by applying ordinary rounding techniques. Further, the ranges stated in this disclosure and the claims are intended to include the entire range specifically and not just the endpoint(s). For example, a range stated to be 0 to 10 is intended to disclose all whole numbers between 0 and 10 such as, for example 1, 2, 3, 4, etc., all fractional numbers between 0 and 10, for example 1.5, 2.3, 4.57, 6.1113, etc., and the endpoints 0 and 10. Also, a range associated with chemical substituent groups such as, for example, "$C_1$ to $C_5$ diols", is intended to specifically include and disclose $C_1$ and $C_5$ diols as well as $C_2$, $C_3$, and $C_4$ diols.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in its respective testing measurements.

As used in the specification and the appended claims, the singular forms "a," "an" and "the" include their plural referents unless the context clearly dictates otherwise. For example, a reference to a "polyester," a "dicarboxylic acid", a "residue" is synonymous with "at least one" or "one or more" polyesters, dicarboxylic acids, or residues and is thus intended to refer to both a single or plurality of polyesters, dicarboxylic acids, or residues. In addition, references to a composition containing or including "an" ingredient or "a" polyester is intended to include other ingredients or other polyesters, respectively, in addition to the one named. The terms "containing" or "including" are intended to be synonymous with the term "comprising", meaning that at least the named compound, element, particle, or method step, etc., is present in the composition or article or method, but does not exclude the presence of other compounds, catalysts, materials, particles, method steps, etc, even if the other such compounds, material, particles, method steps, etc., have the same function as what is named, unless expressly excluded in the claims.

Also, it is to be understood that the mention of one or more process steps does not preclude the presence of additional process steps before or after the combined recited steps or intervening process steps between those steps expressly identified. Moreover, the lettering of process steps or ingredients is a convenient means for identifying discrete activities or ingredients and the recited lettering can be arranged in any sequence, unless otherwise indicated.

The term "unsaturated polyester resin", as used herein, is synonymous with the term "unsaturated polyester" and is intended to mean a thermosetting polymer prepared by the polycondensation of one or more diacid components and diol components and which contains ethylenically unsaturated carbons. The unsaturation, typically, is introduced into the polyester by condensation with unsaturated diacids, such as for example, maleic (typically used as the anhydride) or fumaric acids. Unsaturated polyester resins typically are crosslinked by polymerization through their double bonds with a ethylenically unsaturated monomer, e.g., styrene, to produce a hard, thermoset, crosslinked polymer. Some representative applications for unsaturated polyester resin compositions are the manufacture of plastic laminates for marine construction, bathware and shower stalls, electrical components, pipes, tanks, ducts, sheet molding compounds for the automobile and transportation industries, gel coats, buttons, and synthetic marble castings.

The term "residue", as used herein in reference to the polyester resins of the invention, means any organic structure incorporated into a polymer through a polycondensation or ring opening reaction involving the corresponding monomer. It will also be understood by persons having ordinary skill in the art, that the residues associated within the various curable polyesters of the invention can be derived from the parent monomer compound itself or any derivative of the parent compound. For example, the dicarboxylic acid residues referred to in the polymers of the invention may be derived from a dicarboxylic acid monomer or its associated acid halides, esters, salts, anhydrides, or mixtures thereof. Thus, as used herein, the term "dicarboxylic acid" is intended to include dicarboxylic acids and any derivative of a dicarboxylic acid, including its associated acid halides, esters, half-esters, salts, half-salts, anhydrides, mixed anhydrides, or mixtures thereof, useful in a polycondensation process with a diol to make an unsaturated polyester resin. For example, 2-butenedioic acid residues can be incorporated into the unsaturated polyester resin of the present invention through the use of maleic acid, maleic anhydride, fumaric acid, or the alkyl esters of maleic and fumaric acid, the half esters, salts and half salts, acid halides, or mixtures thereof.

The diacid residues comprise about 10 to about 90 mole percent of the residues of at least one diacid chosen from 1,4-cyclohexanedicarboxylic acid, 1,2-hexahydrophthalic acid, isophthalic acid, terephthalic acid, phthalic acid, and 1,3-cyclohexanedicarboxylic acid, based on the total moles of diacid residues, and about 90 to about 10 mole percent of the residues of 2-butenedioic acid. The 2-butenedioic acid residues present may be derived from maleic anhydride, maleic acid or fumaric acid. Some representative, additional examples diacid residues ranges are about 30 to about 70 mole percent and about 40 to about 60 mole percent of the residues chosen from 1,4-cyclohexanedicarboxylic acid, 1,2-hexahydrophthalic acid, isophthalic acid, terephthalic acid, phthalic acid, and 1,3-cyclohexanedicarboxylic acid and about 70 to about 30 and about 60 to about 40 mole percent 2-butenedioic acid residues.

The unsaturated polyester resin also comprises diol residues, comprising about 20 to about 90 mole percent of the residues of 2,2,4,4-tetramethyl-1,3-cyclobutanediol and about 80 to about 10 mole percent of the residues of 1,2-propanediol. In another example, the diol residues comprise about 40 to about 90 mole percent of the residues of 2,2,4,4-tetramethyl-1,3-cyclobutanediol and about 60 to about 10 mole percent of the residues of 1,2-propanediol. In still another example, the diol residues comprise about 60 to about 85 mole percent of the residues of 2,2,4,4-tetramethyl-1,3-cyclobutanediol and about 40 to about 15 mole percent of the residues of 1,2-propanediol. In addition to 2,2,4,4-tetramethyl-1,3-cyclobutanediol and 1,2-propanediol, the diol residues of our novel unsaturated polyester resin may further comprise from 0 to about 60 mole percent of the residues of at least one diol chosen from 2,2-dimethyl-1,3-propanediol, 1,4-cyclohexanedimethanol, 1,3-cyclohexanedimethanol, 1,2-cyclohexanedimethanol, ethylene glycol, diethylene glycol, triethylene glycol, tetraethylene glycol, pentaethylene glycol, hexaethylene glycol, heptaethylene glycol, octaethylene glycol, nonaethylene glycol, decaethylene glycol, 1,3-propanediol, 2-methyl-1,3-propanediol, 2,4-dimethyl-2-ethyl-hexane-1,3-diol, 2-butyl-2-ethyl-1,3-propanediol, 2-ethyl-2-isobutyl-1,3-propanediol, 1,3-butanediol, 1,4-butanediol, 1,5-pentanediol, 1,6-hexanediol, 2,2,4-tetramethyl-1,6-hexanediol, thiodiethanol, 2,2,4-trimethyl 1,3-pentanediol, p-xylenediol, hydroxypivalyl hydroxypivalate, 1,10-decanediol, and hydrogenated bisphenol A.

The unsaturated polyester resin has an acid number of about 0 to about 50 mg KOH/g polyester or, in other examples, about 0 to about 25 mg KOH/g polyester, and from about 0 to about 15 mg KOH/g polyester. The number average molecular weight of the unsaturated polyester resin is about 300 Daltons to about 10,000 Daltons. Additional examples of molecular weight ranges are from about 1500 to about 5000 daltons, and from about 2000 to about 4500 daltons. The unsaturated polyester resin has a glass transition temperature (abbreviated herein as "Tg") of 0 to about 125° C. Some additional, representative examples of Tg ranges are about 25 to about 80° C., and about 50 to about 80° C. The ICI viscosity of the unsaturated polyester resin can range from about 5 to about 70 poise at a temperature of 175 to 200° C. Additional examples of ICI viscosity ranges are about 10 to about 70 and about 15 to about 70 poise at a temperature of 175 to 200° C.

In another example, the unsaturated polyester resin of the present invention comprises diacid residues comprising about 30 to about 70 mole percent of the residues of at least one diacid chosen from 1,4-cyclohexanedicarboxylic acid, 1,2-hexahydrophthalic acid, isophthalic acid, terephthalic acid, phthalic acid, and 1,3-cyclohexanedicarboxylic acid, and about 70 to about 30 mole percent of the residues of 2-butenedioic acid; and diol residues comprising about 40 to about 90 mole percent of the residues of 2,2,4,4-tetramethyl-1,3-cyclobutanediol and about 60 to about 10 mole percent of the residues of 1,2-propanediol. In another example, the diacid residues comprise the residues of at least one diacid selected from 1,4-cyclohexanedicarboxylic acid and isophthalic acid; and the unsaturated polyester resin has a number average molecular weight of about 1500 to about 5000 daltons and a glass transition temperature of about 25 to about 80° C. In yet another example, the diacid residues comprise about 40 to about 60 mole percent of the residues of 1,4-cyclohexane-dicarboxylic acid or isophthalic acid and about 60 to about 40 mole percent of the residues of 2-butenedioic acid; the diol residues comprise about 60 to about 85 mole percent of the residues of 2,2,4,4-tetramethyl-1,3-cyclobutanediol and about 40 to about 15 mole percent of the residues of 1,2-propanediol; and the polyester has a number average molecular weight of about 2000 to about 4500 daltons and a glass transition temperature of about 50 to about 80° C. In still another embodiment, the diacid residues may comprise about 40 to about 75 mole percent of the residues 1,4-cyclohexanedicarboxylic acid and about 60 to about 25 mole of the residues of 2-butenedioic acid; and the diol residues may comprise about 35 to about 45 mole percent of the residues of 2,2-dimethyl-1,3-propanediol, about 35 to about 45 mole percent of the residues 2,2,4,4-tetramethyl-1,3-cyclobutanediol, and about 10 to about 30 mole percent of the residues of 1,2-propanediol. The unsaturated polyester resin can have a Tg of about 25° C. to about 80° C. and an acid number less than 20 mg KOH/g resin.

Fire retardancy or flame resistance can be imparted to the unsaturated polyester resins of the invention by the incorporation of monomers or additives with fire retardant properties. Fire retardant monomers often contain halogen substituents. Thus, another embodiment of the present invention is an unsaturated polyester comprising diacid residues comprising about 10 to about 90 mole percent of the residues of at least one diacid chosen from chlorendic anhydride, tetrabromophthalic anhydride, dibromoneopentyl glycol, tetrabromobisphenol A, 1,4-cyclohexanedicarboxylic acid, 1,2-hexahydrophthalic acid, isophthalic acid, terephthalic acid, phthalic acid, and 1,3-cyclohexanedicarboxylic acid based on the total moles of diacid residues, and about 90 to about 10 mole percent of the residues of 2-butenedioic acid; and diol residues, comprising about 20 to about 90 mole percent of the residues of 2,2,4,4-tetramethyl-1,3-cyclobutanediol and about 80 to about 10 mole percent of the residues 1,2-propanediol.

In general, the unsaturated polyester resins may be prepared by combining the monomers and heating the reaction mixture at temperatures in the range of about 120° C. to about 200° C. in two or more stages. The forcing conditions of known polyester forming reactions, however, can result in extensive decomposition of 2,2,4,4-tetramethyl-1,3-cyclobutanediol which, in turn, can result in high color and a polyester product with unsuitable molecular weight. We have found that the presence of 1,2-propanediol in the polyester reaction mixture reduces the decomposition of 2,2,4,4-tetramethyl-1,3-cyclobutanediol and the allows for the efficient preparation of the unsaturated polyester. Thus, another aspect of the present invention is process for the preparation of an unsaturated polyester resin, comprising I. heating a mixture comprising:
   A. a diacid component, comprising about 10 to about 90 mole percent of at least one diacid chosen from 1,4-cyclohexanedicarboxylic acid, 1,2-hexahydrophthalic acid, isophthalic acid, terephthalic acid, phthalic acid, and 1,3-cyclohexanedicarboxylic acid, based on the total moles of diacid in steps I and II; and
   B. a diol component comprising about 20 to about 90 mole percent of 2,2,4,4-tetramethyl-1,3-cyclobutanediol and about 80 to about 10 mole percent of 1,2-propanediol, based on the total moles of diol;
   while removing the water of esterification to form an intermediate polymerization product; and II. heating the intermediate polymerization product and about 90 to about 10 mole percent of one or more of a 2-butenedioic acid, an ester thereof, or an anhydride thereof, based on the total moles of diacid in steps I and II, while removing the water of esterification to form an unsaturated polyester resin, wherein the unsaturated polyester resin has a number average molecular weight of about 300 to about 10,000 daltons; a glass transition temperature of about 0 to about 125° C.; an acid number of 0 to about 50 mg KOH/g of polyester resin; and a ICI viscosity of about 5 to about 70 poise at a temperature of 175 to 200° C.

Our process comprises heating a mixture of a diacid component, comprising about 10 to about 90 mole percent of at least one diacid chosen from 1,4-cyclohexane-dicarboxylic acid, 1,2-hexahydrophthalic acid, isophthalic acid, terephthalic acid, phthalic acid, and 1,3-cyclohexanedicarboxylic acid, based on the total moles of diacid in steps I and II, with a diol component, comprising about 20 to about 90 mole percent of 2,2,4,4-tetramethyl-1,3-cyclobutanediol and about 80 to about 10 mole percent of 1,2-propanediol, based on the total moles of diol, under polyesterification conditions while removing the water of esterification to form an intermediate polymerization product. Maleic anhydride, 2-butenedioic acid, or an ester thereof is then added to the intermediate polymerization product and the polymerization reaction is continued with water removal, typically, until a target acid number is obtained.

The unsaturated polyester resin produced by our process, typically, has a number average molecular weight of about 300 to about 10,000 daltons; a glass transition temperature of about 0 to about 125° C.; an acid number of 0 to about 50 mg KOH/g of polyester resin; and a ICI viscosity of about 5 to about 70 poise at a temperature of 175 to 200° C. Persons skilled in the art will recognize, however, that our process and the polyester resin produced therefrom will encompass the various embodiments of diacid, diols, acid number, and number average molecular weight as described hereinabove and in any combination.

For example, the diacid component of the process of the invention may comprise about 30 to about 70 mole percent of at least one diacid chosen from 1,4-cyclohexanedicarboxylic acid, 1,2-hexahydrophthalic acid, isophthalic acid, terephthalic acid, phthalic acid, and 1,3-cyclohexanedicarboxylic acid; and the diol component may comprise about 40 to about 90 mole percent of 2,2,4,4-tetramethyl-1,3-cyclobutanediol and about 60 to about 10 mole percent of 1,2-propanediol. The intermediate polymerization product in step II may be heated with about 70 to about 30 mole percent of one or more of the 2-butenedioic acid, an ester thereof, or an anhydride thereof.

In another example, the diacid component may comprise about 40 to about 60 mole percent of 1,4-cyclohexanedicarboxylic acid or isophthalic acid; and the diol component may comprise about 60 to about 85 mole percent of 2,2,4,4-tetramethyl-1,3-cyclobutanediol and about 40 to about 15 mole percent of 1,2-propanediol. The intermediate polymerization product in step II may be heated with about 60 to about 40 mole percent of one or more of the 2-butenedioic acid, an ester thereof, or an anhydride thereof to produce an unsaturated polyester resin having a number average molecular weight of about 2000 to about 4500 daltons and a glass transition temperature of about 50 to about 80° C.

The curable, unsaturated polyester resin can be copolymerized with a ethylenically unsaturated monomer such as, for example, styrene, vinyl toluene, or methyl(meth)acrylate to produce a curable, unsaturated polyester coating composition. Thus, another embodiment of the instant invention is a curable, unsaturated polyester composition comprising:

I. an unsaturated polyester resin, comprising:
  A. diacid residues, comprising about 10 to about 90 mole percent of the residues of at least one diacid chosen from 1,4-cyclohexanedicarboxylic acid, 1,2-hexahydrophthalic acid, isophthalic acid, terephthalic acid, phthalic acid, and 1,3-cyclohexanedicarboxylic acid, based on the total moles of diacid residues, and about 90 to about 10 mole percent of the residues of 2-butenedioic acid; and
  B. diol residues, comprising about 20 to about 90 mole percent of the residues of 2,2,4,4-tetramethyl-1,3-cyclobutanediol and about 80 to about 10 mole percent of the residues of 1,2-propanediol, based on the total moles of diol residues;
  wherein the polyester has a number average molecular weight of about 300 to about 10,000 daltons; a glass transition temperature of about 0 to about 125° C.; an acid number of 0 to about 15 mg KOH/g of polyester resin; and a ICI viscosity of about 5 to about 70 poise; and II. an ethylenically unsaturated monomer copolymerizable with the unsaturated polyester resin.

The unsaturated polyester resin of the composition comprises diacid residues which comprise about 10 to about 90 mole percent of the residues of at least one diacid chosen from 1,4-cyclohexanedicarboxylic acid, 1,2-hexahydrophthalic acid, isophthalic acid, terephthalic acid, phthalic acid, and 1,3-cyclohexanedicarboxylic acid, based on the total moles of diacid residues, and about 90 to about 10 mole percent of the residues of 2-butenedioic acid. In addition, the unsaturated polyester resin comprises diol residues, comprising about 20 to about 90 mole percent of the residues of 2,2,4,4-tetramethyl-1,3-cyclobutanediol and about 80 to about 10 mole percent of the residues of 1,2-propanediol, based on the total moles of diol residues. The unsaturated polyester resin has an acid number of about 0 to about 50 mg KOH/g polyester or, in other examples, from about 0 to about 25 mg KOH/g polyester, and from about 0 to about 15 mg KOH/g polyester. The number average molecular weight of the unsaturated polyester resin is about 300 daltons to about 10,000 daltons. In addition to the above embodiments, the unsaturated polyester resin component of the coating composition is understood to include the various embodiments of diacid, diols, acid number, and number average molecular weight as described hereinabove in any combination.

For example, the unsaturated polyester resin can comprise diacid residues comprising about 30 to about 70 mole percent of the residues of at least one diacid chosen from 1,4-cyclohexanedicarboxylic acid, 1,2-hexahydrophthalic acid, isophthalic acid, terephthalic acid, phthalic acid, and 1,3-cyclohexanedicarboxylic acid, and about 70 to about 30 mole percent of the residues of 2-butenedioic acid; and diol residues comprising about 40 to about 90 mole percent of the residues of 2,2,4,4-tetramethyl-1,3-cyclobutanediol and about 60 to about 10 mole percent of the residues of 1,2-propanediol. In another example, the diacid residues can comprise the residues of at least one diacid selected from 1,4-cyclohexanedicarboxylic acid and isophthalic acid; and the unsaturated polyester resin has a number average molecular weight of about 1500 to about 5000 daltons and a glass transition temperature of about 25 to about 80° C. In yet another example, the diacid residues comprise about 40 to about 60 mole percent of the residues of 1,4-cyclohexanedicarboxylic acid or isophthalic acid and about 60 to about 40 mole percent of the residues of 2-butenedioic acid; and the diol residues comprise about 60 to about 85 mole percent of the residues of 2,2,4,4-tetramethyl-1,3-cyclobutanediol and about 40 to about 15 mole percent of the residues of 1,2-propanediol; and the polyester has a number average molecular weight of about 2000 to about 4500 daltons and a glass transition temperature of about 50 to about 80° C.

In addition to 2,2,4,4-tetramethyl-1,3-cyclobutanediol and 1,2-propanediol, the diol residues of our novel unsaturated polyester resin may further comprise from 0 to about 60 mole percent of the residues of at least one diol chosen from 2,2-dimethyl-1,3-propanediol, 2-methyl-1,3-propanediol, 1,4-cyclohexanedimethanol, 1,3-cyclohexane-dimethanol, 1,2-cyclohexanedimethanol, ethylene glycol, diethylene glycol, triethylene glycol, tetraethylene glycol, pentaethylene glycol, hexaethylene glycol, heptaethylene glycol, octaethylene glycol, nonaethylene glycol, decaethylene glycol, 1,3-propanediol, 2,4-dimethyl-2-ethyl-hexane-1,3-diol, 2-butyl-2-ethyl-1,3-propanediol, 2-ethyl-2-isobutyl-1,3-propanediol, 1,3-butanediol, 1,4-butanediol, 1,5-pentanediol, 1,6-hexanediol, 2,2,4-tetramethyl-1,6-hexanediol, thiodiethanol, 2,2,4-trimethyl 1,3-pentanediol, p-xylenediol, hydroxypivalyl hydroxypivalate, 1,10-decanediol, and hydrogenated bisphenol A.

The unsaturated polyesters of our invention may be combined with one or more copolymerizable, ethylenically unsaturated monomers to obtain curable (i.e., polymerizable) polyester compositions useful in the preparation of coatings and casted and molded articles. The ethylenically unsaturated monomer used in the present invention includes, but are not limited to, monovinyl monomers that have heretofore commonly been used as diluents or crosslinking agents for unsaturated polyesters. Some representative classes of ethylenically unsaturated monomers are aromatic vinyl monomers, acrylic monomers, and (meth)acrylic monomers. Examples of aromatic vinyl monomers include styrene, p-chlorostyrene, dichlorostyrene, α-methyl styrene, t-butylstyrene, divinylbenzene, and vinyltoluene.

Representative examples of the acrylic and (meth)acrylic monomers include (meth)acrylic acid and esters thereof, such as methyl(meth)acrylate, ethyl(meth)-acrylate, butyl(meth)acrylate, isobutyl(meth)acrylate, 2-ethylhexyl(meth)acrylate, lauryl(meth)acrylate, propyl(meth)acrylate, isopropyl (meth)acrylate, 2-hydroxyethyl(meth)acrylate, 2-hydroxypropyl(meth)acrylate, 3-hydroxypropyl(meth) acrylate, cyclohexyl(meth)acrylate, isobornyl(meth)acrylate, dicyclopentenyloxyethyl(meth)acrylate, tbutylcyclohexyl (meth)acrylate, or (meth)acrylic acid, methoxy-diethylene glycol(meth)acrylate, methoxytetraethylene glycol(meth) acrylate, methoxypolyethylene glycol(meth)acrylate, β-(meth)acryloyloxyethyl hydrogen phthalate, β-(meth) acryloyloxypropyl hydrogenphthalate, β-(meth)acryloyloxyethyl hydrogensuccinate, nonylphenoxyethyl(meth)acrylate, phenoxydiethylene glycol(meth)acrylate, phenoxypolyethylene glycol(meth)acrylate, methoxytriethylene glycol (meth)acrylate, methoxytriethylene glycol(meth)acrylate, butoxypolyethylene glycol(meth)acrylate, and nonylphenoxyethyl(meth)acrylate; and acrylic acid and esters thereof, such as methyl acrylate, ethyl acrylate, butyl acrylate, propyl acrylate, isopropyl acrylate, 2-ethylhexyl acrylate, lauryl acrylate, 2-hydroxyethyl acrylate, cyclohexyl acrylate, isobornyl acrylate, dicyclopentenyloxyethyl acrylate, t-butylcyclohexyl acrylate, and acrylic acid. For example, the ethylenically unsaturated monomer can comprise styrene, vinyl toluene, methyl(meth)acrylate, α-methyl styrene, or combinations thereof.

The curable, unsaturated polyester compositions thus afforded by our invention typically are comprised of about 30 to 60, preferably about 40 to 50, weight percent of the copolymerizable, ethylenically unsaturated monomer. The unsaturated polyester composition may be cured, i.e., copolymerized with the unsaturated monomer, according to known techniques by mixing a peroxide and, optionally, a promoter with the compositions and then applying the resulting mixtures to various substrates as coatings or forming the mixture into a molded or cast articles. Examples of the peroxides which may be used include methyl ethyl ketone peroxide, benzoyl peroxide, lauroyl peroxide, tertiary butyl perbenzoate and dicumyl peroxide. Cobalt and vanadium salts of carboxylic acids such as cobalt 2-ethylhexanoate, cobalt naphthenate and vanadium 2-ethylhexanoate are examples of the promoters which may be used. The metal salts may be used in combination with copromoters such as 2,4-pentanedione, alkyl acetoacetates, alkyl acetoacetamides, phenyldiethanolamine, dimethylaniline and the like. For example, the unsaturated polyester composition, after blending with the ethylenically unsaturated monomer, may be cured by the addition of a curing package consisting of methyl ethyl ketone peroxide, cobalt octoate salt, dimethyl acetoacetamide, and hydroquinone.

The curable, unsaturated polyester compositions usually contain a phenolic polymerization inhibitor to prevent premature polymerization of a part or all of the compositions. Hydroquinone monomethyl ether (p-methoxyphenol), mono-tertiary butyl hydroquinone, toluhydroquinone and, especially, hydroquinone are typical polymerization inhibitors which may be used. The phenolic compounds normally are employed in polymerization-inhibiting amounts of 50 to 500 ppm.

In addition to curing accelerators and polymerization inhibitors, the curable, unsaturated polyester composition may optionally contain various additives such as fillers, pigments, waxes, ultraviolet absorbers and ultraviolet stabilizers, air-release aids, and thixotropic aids. These compounds may be used alone or in combination.

Examples of the ultraviolet absorbers include benzophenone, benzotriazole, and cyanoacrylate compounds. Examples of the ultraviolet stabilizers include hindered amine compounds. These compounds may be in any form and may have polymerizable reactivity or esterifiable reactivity, and are appropriately selected and used. Examples of thixotropic agents include silica powder, asbestos powder, and the like. Thermoplastic polymers such as poly(meth)acrylic acid resin ("PMMA"); and commercially available macromonomers (AA-6 and AA-10, manufactured by TOAGOSEI CO., LTD.) can be incorporated as long as the performance of the gloss retention is not impaired. Examples of fillers include calcium carbonate, talc, mica, clay, silica powder, colloidal silica, asbestos powder, barium sulfate, aluminum hydroxide, glass powder, alumina powder, silicon dioxide powder, glass beads, and crushed sand.

Various pigments, well known to persons skilled in the art, may be used in the unsaturated polyester composition of the present invention. Examples thereof include titanium white, red iron oxide, condensed azo red, titanium yellow, cobalt blue, quinacridon red, carbon black, iron black, ultramarine green, blue, perinone, Prussian blue, isoindolinone, chrome green, cyanine blue, and green. Those, which are superior in ultraviolet stability and do not inhibit curing of the polyester resin are selected and incorporated according to color tone. These coloring pigments can be dispersed or mixed directly with the polyester resin, or can be added in the form of a color toner prepared by previously kneading with a saturated or unsaturated polyester solid. The amount of the pigment is preferably within a range from 0.1 to 50 parts by weight based on 100 parts by weight of those prepared by dissolving the unsaturated polyester and polymerizable unsaturated monomer.

As noted above, any of the above embodiments of the unsaturated polyester composition may be cured and applied to various substrates as coatings or formed into molded or casted articles. For example, the unsaturated polyester composition can be used for vehicle members, housing materials, chairs, desks, panels, and automobile parts. Fiber reinforcers can also be added to the unsaturated polyester resin composition of the present invention. Examples of the reinforcer include glass fibers (e.g., chopped strand mat, glass roving cloth, etc.), carbon fibers, organic fibers (e.g., vinylon, polyester, phenol, etc.), and metal fibers. A fiber reinforced plastic ("FRP") can be obtained by adding 10 to 70% by weight of the reinforcer. The FRP molded article of the present invention is obtained by forming a gel coating layer on the surface of a mold using a gel coating material made of the unsaturated polyester resin composition of the present invention, and by forming a backing layer according to known molding methods.

The unsaturated polyester resin composition of the present invention is suited for use in coating materials such as lining materials, coating compositions, and particularly preferably gel coating materials. Because of its osmotic blister resistance characteristics, our unsaturated polyester resin composition is especially suited for casted or molded articles which have at least one surface that is persistently exposed to organic or aqueous liquids such as, for example, boat hulls, bathtubs, unit baths, wash stands, tanks, pipes, swimming pool walls, or kitchen utensils. The term "aqueous liquid" is intended to mean any liquid containing about 10 to 100 weight percent water. The invention is further illustrated by the following examples.

EXAMPLES

General—Acid number was determined by titration with potassium hydroxide and reported as mg of potassium hydroxide consumed for each gram of resin (mg KOH/g resin). Resin melt viscosity was determined using a BYK-Gardner cone and plate melt viscometer at 175° C. or 200° C. Number average molecular weight and weight average molecular weight was determined by gel permeation chromatography in tetrahydrofuran using polystyrene equivalents and UV detection. Glass transition temperature ("Tg") was determined by differential scanning calorimetry ("DSC") on the second heat cycle scanning at 20° C./minute after the sample had been melted and quenched to below the resin Tg. Tg values are reported as midpoint values. Heat deflection temperature of resin castings was determined by ASTM method D 648 with 0.455 MPa weight. Flexural Strength Physical Properties were determined by ASTM method D 790. Boiling Water Blister Resistance was evaluated by ASTM method D-714 ("Evaluating Degree of Blistering of Paints") and percent water uptake. Blistering was rated according to the following Blister Rating Key from ASTM Method D-714:

| Blister Size | Blister Frequency |
| --- | --- |
| 0 - None | 0 - No Blisters |
| 8 - Smallest | 1 - Few |
| 6 | 2 - Medium |
| 4 | 3 - Medium Dense |
| 2 - Largest | 4 - Dense |

Comparative Example 1

A computer controlled reaction apparatus consisting of a variable heating source, nitrogen blanket and subsurface sparge, mechanical variable speed stirrer, oil-heated partial condensing column with a maintained column mid-point temperature of 103° C., and a glycol-cooled total condenser maintained at 15° C. was used to prepare the following resin via a two-stage synthesis. A 2000-ml kettle type reaction flask was charged with the following materials: 522.14 g (5.01 mol) 2,2-dimethyl-1,3-propanediol, 67.31 g (0.88 mol) 1,2-propanediol, 483.10 g (2.81 mol) 1,4-cyclohexanedicarboxylic acid, and 0.60 g (500 ppm) butylstannoic acid. The mixture was heated from 25° C. to 150° C. over a period of 125 minutes under a nitrogen flow of 0.8 standard cubic feet per hour and intermittent stirring. The reaction temperature was then increased from 150° C. to 180° C. over a time period of 60 minutes and held for 30 minutes at 180° C. The reaction temperature was increased from 180° C. to 200° C. over a time period of 150 minutes. The reaction temperature was held at 200° C. for 356 minutes. The reaction mixture reached an acid number of 2.4. The 1st stage reaction mixture was cooled to 140° C. and 275.12 g (2.81 mol) maleic anhydride added. The temperature increased to approximately 160° C. as a result of the maleic anhydride exotherm. The reaction mixture was allowed to cool to 140° C. and then increased from 140° C. to 200° C. over 60 minutes. The resin was processed for 660 minutes at 200° C. to an acid number of 14.6. The resin was cooled to 140° C. and diluted to 55 wt % polyester with 983.0 g styrene containing 0.44 g hydroquinone resulting in a final resin solution at 201 ppm hydroquinone. The neat resin and subsequent resin solution had the following properties:

| Property | Value |
| --- | --- |
| Acid Number (mg KOH/g resin) | 14.6 |
| ICI Viscosity (poise) | 6.5 @ 175° C. |
| MW (number average) | 3063 |
| MW (weight average) | 8724 |
| Tg, ° C. (2nd Cycle Midpoint) | 7.8 |
| Resin Solution Appearance (55% resin in styrene) | Clear |

Comparative Example 2

The same reactor set-up used for Comparative Example 1 was used for Comparative Example 2. A 2000-ml kettle type reaction flask was charged with the following materials: 771.74 g (3.24 mol) hydrogenated bis-phenol A, 43.47 g (0.57 mol) 1,2-propanediol, 303.33 g (1.76 mol) 1,4-cyclohexanedicarboxylic acid, and 0.60 g (500 ppm) butylstannoic acid. The mixture was heated from 25° C. to 150° C. over a period of 125 minutes under a nitrogen flow of 0.8 standard cubic feet per hour and intermittent stirring. The reaction temperature was then increased from 150° C. to 180° C. over a time period of 60 minutes and held for 30 minutes at 180° C. The reaction temperature was increased from 180° C. to 200° C. over a time period of 150 minutes. The reaction temperature was held at 200° C. for 313 minutes. The reaction mixture reached an acid number of 9.3. The 1st stage reaction mixture was cooled to 140° C. and 172.75 g (1.76 mol) maleic anhydride added. The temperature increased to approximately 160° C. as a result of the maleic anhydride exotherm. The reaction mixture was allowed to cool to 140° C. and the temperature increased from 140° C. to 200° C. over 60 minutes. The resin was processed for 642 minutes at 200° C. to an acid number of 21.6. The resin was cooled to 160° C. and due to the high viscosity, transferred to a container without dilution with styrene. A 55 wt % polyester solution in styrene was prepared by dissolving 550.0 g resin in 450.0 g styrene at room temperature. A 0.201 g portion of hydroquinone was added resulting in a final resin solution containing 201 ppm hydroquinone. The neat resin and subsequent resin solution had the following properties:

| Property | Value |
| --- | --- |
| Acid Number (mg KOH/g resin) | 21.6 |
| ICI Viscosity (poise) | >100 @ 200° C. |
| MW (number average) | 2481 |
| MW (weight average) | 7018 |
| Tg, ° C. (2nd Cycle Midpoint) | 100.2 |
| Resin Solution Appearance (55% resin in styrene) | Very hazy |

Comparative Example 3

The same reactor set-up used for the Comparative Example 1 was used for Comparative Example 3. A 2000-ml kettle type reaction flask was charged with the following materials: 627.3 g (4.36 mol) 1,4-cyclohexanedimethanol, 57.82 g (0.76 mol) 1,2-propanediol, 411.87 g (2.39 mol) 1,4-cyclohexanedicarboxylic acid, and 0.60 g (500 ppm) butylstannoic acid. The mixture was heated from 25° C. to 150° C. over a period of 125 minutes under a nitrogen flow of 0.8 standard cubic feet per hour and intermittent stirring. The reaction temperature was then increased from 150° C. to 180° C. over a time period of 60 minutes and held for 30 minutes at 180° C. The reaction temperature was increased from 180° C. to 200° C. over a time period of 150 minutes. The reaction temperature was held at 200° C. for 400 minutes. The reaction mixture reached an acid number of 2.1. The 1st stage reaction mixture was cooled to 140° C. and 234.56 g (2.39 mol) maleic anhydride added. The temperature increased to approximately 160° C. as a result of the maleic anhydride exotherm. The reaction mixture was allowed to cool to 140° C. and the temperature increased from 140° C. to 200° C. over 60 minutes. The resin was processed for 600 minutes at 200° C. to an acid number of 9.0. The resin was cooled to 140° C. and diluted to 55 wt % polyester with 983.0 g styrene containing 0.44 g hydroquinone resulting in a final resin solution containing about 201 ppm hydroquinone. The neat resin and subsequent resin solution had the following properties:

| Property | Value |
| --- | --- |
| Acid Number (mg KOH/g resin) | 9.0 |
| ICI Viscosity (poise) | >100 @ 200° C. |
| MW (number average) | 4274 |
| MW (weight average) | 12549 |
| Tg, ° C. (2nd Cycle Midpoint) | 21.9 |
| Resin Solution Appearance (in styrene at 55%) | Clear |

Example 1

The same reactor set-up used for the Comparative Example 1 was used for Example 1. A 2000-ml kettle type reaction flask was charged with the following materials: 377.83 g (3.63 mol) 2,2-dimethyl-1,3-propanediol, 171.66 g (1.19 mol) 2,2,4,4-tetramethyl-1,3-cyclobutanediol, 64.69 g (0.85 mol) 1,2-propanediol, 463.40 g (2.69 mol) 1,4-cyclohexanedicarboxylic acid, and 0.60 g (500 ppm) butylstannoic acid. The mixture was heated from 25° C. to 150° C. over a period of 125 minutes under a nitrogen flow of 0.8 standard cubic feet per hour and intermittent stirring. The reaction temperature was then increased from 150° C. to 180° C. over a time period of 60 minutes and held for 30 minutes at 180° C. The reaction temperature was increased from 180° C. to 200° C. over a time period of 150 minutes. The reaction temperature was held at 200° C. for 252 minutes. The reaction mixture reached an acid number of 5.0. The 1st stage reaction mixture was cooled to 140° C. and 263.90 g (2.69 mol) maleic anhydride added. The temperature increased to approximately 160° C. as a result of the maleic anhydride exotherm. The reaction mixture was allowed to cool to 140° C. and the temperature increased from 140° C. to 200° C. over 60 minutes. The resin was processed for 720 minutes at 200° C. to an acid number of 11.3. The resin was cooled to 140° C. and diluted to 55 wt % polyester with 983.0 g styrene containing 0.15 g hydroquinone resulting in a final resin solution with 69 ppm hydroquinone. The neat resin and subsequent resin solution had the following properties:

| Property | Value |
| --- | --- |
| Acid Number (mg KOH/g resin) | 11.3 |
| ICI Viscosity (Poise) | 13.7 @ 200° C. |
| MW (number average) | 4050 |
| MW (weight average) | 12811 |
| Tg, ° C. (2nd Cycle Midpoint) | 21.3 |
| Resin Solution Appearance (in styrene at 55%) | Clear |

Example 2

The same reactor set-up used for the Comparative Example 1 was used for Example 2. A 2000-ml kettle type reaction flask was charged with the following materials: 241.28 g (2.32 mol) 2,2-dimethyl-1,3-propanediol, 334.08 g (2.32 mol) 2,2,4,4-tetramethyl-1,3-cyclobutanediol, 62.21 g (0.82 mol) 1,2-propanediol, 444.78 g (2.58 mol) 1,4-cyclohexanedicarboxylic acid, and 0.60 g (500 ppm) butylstannoic acid. The mixture was heated from 25° C. to 150° C. over a period of 125 minutes under a nitrogen flow of 0.8 standard cubic feet per hour and intermittent stirring. The reaction temperature was then increased from 150° C. to 180° C. over a time period of 60 minutes and held for 30 minutes at 180° C. The reaction temperature was increased from 180° C. to 200° C. over a time period of 150 minutes. The reaction temperature was held at 200° C. for 358 minutes. The reaction mixture reached an acid number of 4.7. The 1st stage reaction mixture was cooled to 140° C. and 253.30 g (2.58 mol) maleic anhydride added. The temperature increased to approximately 160° C. as a result of the maleic anhydride exotherm. The reaction mixture was allowed to cool to 140° C. and the temperature increased from 140° C. to 200° C. over 60 minutes. The resin was processed for 720 minutes at 200° C. to an acid number of 18.8. The resin was cooled to 140° C. and diluted to 55 wt % polyester with 983.0 g styrene containing 0.15 g hydroquinone resulting in a final resin solution containing 69 ppm hydroquinone. The neat resin and subsequent resin solution had the following properties:

| Property | Value |
| --- | --- |
| Acid Number (mg KOH/g resin) | 18.8 |
| ICI Viscosity (poise) | 19.9 @ 200° C. |
| MW (number average) | 3748 |
| MW (weight average) | 10347 |
| Tg, ° C. (2nd Cycle Midpoint) | 29.1 |
| Resin Solution Appearance (in styrene at 55%) | Clear |

Example 3

The same reactor set-up used for the Comparative Example 1 was used for Example 3. A 2000-ml kettle type reaction flask was charged with the following materials: 621.08 g (4.31 mol) 2,2,4,4-tetramethyl-1,3-cyclobutanediol, 57.82 g (0.76 mol) 1,2-propanediol, 411.87 g (2.39 mol) 1,4-cyclohexanedicarboxylic acid, and 0.60 g (500 ppm) butylstannoic acid. The mixture was heated from 25° C. to 150° C. over a period of 125 minutes under a nitrogen flow of 0.8 standard cubic feet per hour and intermittent stirring. The reaction temperature was then increased from 150° C. to 180° C. over a time period of 60 minutes and held for 30 minutes at 180° C. The reaction temperature was increased from 180° C. to 200° C. over a time period of 150 minutes. The reaction temperature was held at 200° C. for 442 minutes. The reaction mixture reached an acid number of 9.5. The 1st stage reaction mixture was cooled to 140° C. and 234.56 g (2.39 mol) maleic anhydride added. The temperature increased to approximately 160° C. as a result of the maleic anhydride exotherm. The reaction mixture was allowed to cool to 140° C. and the temperature increased from 140° C. to 200° C. over 60 minutes. The resin was processed for 720 minutes at 200° C. to an acid number of 18.8. The resin was cooled to 140° C. and diluted to 55 wt % polyester with 983.0 g styrene containing 0.15 g hydroquinone resulting in a final resin solution at 69 ppm hydroquinone. The neat resin and subsequent resin solution had the following properties:

| Property | Value |
| --- | --- |
| Acid Number (mg KOH/g resin) | 16.6 |
| ICI Viscosity (poise) | >100 @ 200° C. |
| MW (number average) | 4074 |
| MW (weight average) | 14653 |
| Tg, ° C. (2nd Cycle Midpoint) | 66.7 |
| Resin Solution Appearance (in styrene at 55%) | Clear |

Preparation and Physical Properties of Resin Castings—Resin castings (⅛") for flexural mechanical testing and heat deflection temperature were prepared from the resins of Comparative Examples 1-3 and Examples 1-3 by catalyzing a 55 weight percent resin in styrene solution using the cure package below. The catalyzed resin was transferred to a mold. After curing overnight, castings were post cured at 120° C. for two hours.

| Cure Package | |
| --- | --- |
| Ingredients | Weight, grams |
| Resin (55% in styrene) | 200.00 |
| Cobalt octoate, 6% active | 0.80 |
| Dimethyl acetoacetamide (DMAA) copromoter | 0.60 |

| Cure Package | |
| --- | --- |
| Ingredients | Weight, grams |
| Hydroquinone inhibitor | 0.02 |
| Methyl ethyl ketone peroxide (MEKP-925) | 2.00 |

TABLE 1

Mechanical Properties of Resin Castings

| Property | CE 1 | CE 2 | CE 2 | Ex 1 | Ex 2 | Ex 3 |
| --- | --- | --- | --- | --- | --- | --- |
| Heat Deflection Temperature, ° C. | 92 | 118 | 81 | 107 | 126 | 145 |
| Resin Tg | 9 | 100 | 22 | 21 | 29 | 67 |
| Fumarate Level, % | 84 | 82 | 66 | 85 | 93 | 94 |

Preparation and Weathering Properties of Gel Coat Formulation—Pigment grinds were prepared from the resins of Comparative Examples 1-3 and Examples 1-3 using a high-speed toothed blade disperser and had the following formulation:

| Gel Coat Grind | |
| --- | --- |
| Ingredient | Weight, grams |
| Resin (55% in styrene) | 53.28 |
| Titanium dioxide grade R-902 | 79.92 |
| Additional resin (55% in styrene) | 260.80 |
| Amorphous fumed silica type M-5 | 6.00 |

The pigment was added slowly to the initial resin charge under low shear. Once all the pigment was added, shear was increased and the grind processed at a tip speed of approximately 10.7 meters/second. After 5 minutes, the grind reached a Hegman Fineness of Grind reading of >7. The remaining letdown resin was added to the pigment grind under low shear. The fumed silica was added slowly under low shear and then processed at 10.7 m/s for 5 minutes maintaining a Hegman Fineness of Grind reading of >7. The gel coat was formulated as follows:

| Gel Coat Formulation | |
| --- | --- |
| Ingredient | Weight, grams |
| Gel coat grind | 110.00 |
| Cobalt octoate, 6% active | 0.44 |
| Air release additive type BYK A-500 | 0.28 |
| Dimethyl acetoacetamide (DMAA) copromoter | 0.33 |
| Hydroquinone inhibitor | 0.01 |
| Methyl ethyl ketone peroxide (MEKP-925) | 1.10 |

TABLE 2

Blister Resistance and Moisture Uptake Properties of Prepared Gel Coat Resins After 200 hrs Exposure in Distilled Water at 100° C.

| Property | CE 1 | CE 2 | CE 3 | Ex 1 | Ex 2 | Ex 3 |
|---|---|---|---|---|---|---|
| Blister Resistance, ASTM D 714 | | | | | | |
| Blister Size | 2 | 0 | 4 | 4 | 2 | 0 |
| Blister Frequency | 3 | 0 | 4 | 2 | 2 | 0 |
| Percent Moisture Uptake | 1.21 | 0.83 | 1.26 | 1.13 | 0.98 | 0.86 |

Comparative Example 4

A computer controlled reaction apparatus consisting of a variable heating source, nitrogen blanket and subsurface sparge, mechanical variable speed stirrer, oil-heated partial condensing column with a maintained column mid-point temperature of 103° C., and a glycol-cooled total condenser maintained at 15° C. was used to prepare the following resin via a two-stage synthesis. A 2000-ml kettle type reaction flask was charged with the following materials: 661.74 g (6.35 mol) 2,2-dimethyl-1,3-propanediol, 85.30 g (1.12 mol) 1,2-propanediol, 591.34 g (3.56 mol) isophthalic acid, and 0.60 g (500 ppm) butylstannoic acid. The mixture was heated from 25° C. to 150° C. over a period of 125 minutes under a nitrogen flow of 0.8 standard cubic feet per hour and intermittent stirring. The reaction temperature was then increased from 150° C. to 180° C. over a time period of 60 minutes and held for 30 minutes. The reaction temperature was increased from 180° C. to 200° C. over a time period of 150 minutes. The reaction was held at 200° C. for 360 minutes reaching an acid number of 1.85 mg KOH/g resin. The $1^{st}$ stage reaction mixture was cooled to 140° C. and 349.01 g (3.56 mol) maleic anhydride added. The temperature increased to approximately 160° C. as a result of the maleic anhydride exotherm. The temperature was allowed to cool to 140° C. and the temperature increased from 140 to 200° C. over 60 minutes. The resin was processed for 660 minutes at 200° C. to an acid number of 14.4 mg KOH/g resin. The resin was cooled to 140° C. and diluted to 55 wt % solids with styrene. A 0.54 g portion of hydroquinone was added to the resin solution giving a hydroquinone concentration of approximately 200 ppm. The neat resin had the following properties prior to dilution with styrene:

| Property | Value |
|---|---|
| Acid Number | 14 |
| ICI Viscosity @ 175° C. (poise) | 12 |
| MW (number average) | 2940 |
| MW (weight average) | 7974 |
| Tg, ° C. ($2^{nd}$ Heat Midpoint) | 31 |
| Resin Solution Appearance (55% resin in styrene) | Clear |

Comparative Example 5

The same reactor set-up used for the Comparative Example 4 was used for Comparative Example 4. A 2000-ml kettle type reaction flask was charged with the following materials: 779.18 g (3.27 mol) hydrogenated bis-phenol A, 43.75 g (0.58 mol) 1,2-propanediol, 295.00 g (1.78 mol) isophthalic acid, and 0.60 g (500 ppm) butylstannoic acid. The mixture was heated from 25° C. to 150° C. over a period of 125 minutes under a nitrogen flow of 0.8 standard cubic feet per hour and intermittent stirring. The reaction temperature was then increased from 150° C. to 180° C. over a time period of 60 minutes and held for 30 minutes. The reaction temperature was increased from 180° C. to 200° C. over a time period of 150 minutes. The reaction temperature was held at 200° C. for 394 minutes reaching an acid number of 8.2 mg KOH/g resin. The $1^{st}$ stage reaction mixture was cooled to 140° C. and 174.11 g (1.78 mol) maleic anhydride added. The temperature increased to approximately 160° C. as a result of the maleic anhydride exotherm. The reaction mixture was allowed to cool to 140° C. and the temperature increased from 140° C. to 200° C. over 60 minutes. The resin was processed for 266 minutes at 200° C. to an acid number of 21.1 mg KOH/g resin. The resin was cooled to 160° C. and due to the high viscosity, transferred to a container without dilution with styrene. A 55 wt % polyester solution in styrene was prepared by dissolving 550.0 g resin in 450.0 g styrene at room temperature. A 0.201 g portion of hydroquinone was added resulting in a final resin solution containing approximately 200 ppm hydroquinone. The neat resin and subsequent resin solution had the following properties:

| Property | Value |
|---|---|
| Acid Number | 21 |
| ICI Viscosity @ 200° C. (poise) | >100 |
| MW (number average) | 2431 |
| MW (weight average) | 6410 |
| Tg, ° C. ($2^{nd}$ Heat Midpoint) | 118 |
| Resin Solution Appearance (55% resin in styrene) | Clear and thick |

Comparative Example 6

The same reactor set-up used for the Comparative Example 4 was used for Comparative Example 6. A 2000-ml kettle type reaction flask was charged with the following materials: 636.14 g (4.41 mol) 1,4-cyclohexanedimethanol, 58.46 g (0.77 mol) 1,2-propanediol, 401.42 g (2.42 mol) isophthalic acid, and 0.60 g (500 ppm) butylstannoic acid. The mixture was heated from 25° C. to 150° C. over a period of 125 minutes under a nitrogen flow of 0.8 standard cubic feet per hour and intermittent stirring. The reaction temperature was then increased from 150° C. to 180° C. over a time period of 60 minutes and held for 30 minutes. The reaction temperature was increased from 180° C. to 200° C. over a time period of 150 minutes. The reaction temperature was held at 200° C. for 221 minutes reaching an acid number of 0.7 mg KOH/g resin. The $1^{st}$ stage reaction mixture was cooled to 140° C. and 236.92 g (2.42 mol) maleic anhydride added. The temperature increased to approximately 160° C. as a result of the maleic anhydride exotherm. The reaction mixture was allowed to cool to 140° C. and the temperature increased from 140° C. to 200° C. over 60 minutes. The resin was processed for 484 minutes at 200° C. to an acid number of 10.5 mg KOH/g resin. The resin was cooled to 160° C. and due to the high viscosity, transferred to a container without dilution with styrene. A 55 wt % polyester solution in styrene was prepared by dissolving 550.0 g resin in 450.0 g styrene at room temperature. A 0.201 g portion of hydroquinone was added resulting in a final resin solution containing approximately 200 ppm hydroquinone. The neat resin and subsequent resin solution had the following properties:

| Property | Value |
| --- | --- |
| Acid Number | 10 |
| ICI Viscosity @ 200° C. (poise) | 49 |
| MW (number average) | 3822 |
| MW (weight average) | 12656 |
| Tg, ° C. ($2^{nd}$ Heat Midpoint) | 47 |
| Resin Solution Appearance (55% resin in styrene) | Hazy and thick |

Example 4

The same reactor set-up used for Comparative Example 4 was used for Example 4. A 2000-ml kettle type reaction flask was charged with the following materials: 175.69 g (1.22 mol) 2,2,4,4-tertamethyl-1,3-cyclobutanediol, 386.69 g (3.71 mol) 2,2-dimethyl-1,3-propanediol, 65.55 g (0.86 mol) 1,2-propanediol, 453.53 (2.73 mol) isophthalic acid, and 0.6 g (500 ppm) butylstannoic acid. The mixture was heated from 25° C. to 150° C. over a period of 125 minutes under a nitrogen flow of 0.8 standard cubic feet per hour and intermittent stirring. The reaction temperature was then increased from 150° C. to 180° C. over a time period of 60 minutes and held for 30 minutes. The reaction temperature was increased from 180° C. to 200° C. over a time period of 150 minutes. The reaction was held at 200° C. for 387 minutes reaching an acid number of 4.1 mg KOH/g resin. The $1^{st}$ stage reaction mixture was cooled to 140° C. and 267.68 g (2.74 mol) maleic anhydride added. The temperature increased to approximately 160° C. as a result of the maleic anhydride exotherm. The temperature was allowed to cool to 140° C. and the temperature increased from 140 to 200° C. over 60 minutes. The resin was processed for 609 minutes at 200° C. to an acid number of 20.0 mg KOH/g resin. The resin was cooled to 140° C. and diluted to 55 wt % solids with styrene. A 0.32 g portion of hydroquinone was added to the resin solution giving a hydroquinone concentration of approximately 150 ppm. The neat resin had the following properties prior to dilution with styrene:

| Property | Value |
| --- | --- |
| Acid Number | 20 |
| ICI Viscosity @ 175° C. (poise) | 16 |
| MW (number average) | 2491 |
| MW (weight average) | 5564 |
| Tg, ° C. ($2^{nd}$ Heat Midpoint) | 36 |
| Resin Solution Appearance (55% resin in styrene) | Clear |

Example 5

The same reactor set-up used for Comparative Example 4 was used for Example 5. A 2000-ml kettle type reaction flask was charged with the following materials: 341.88 g (2.37 mol) 2,2,4,4-tertamethyl-1,3-cyclobutanediol, 246.91 g (2.37 mol) 2,2-dimethyl-1,3-propanediol, 63.03 g (0.83 mol) 1,2-propanediol, 434.85 (2.62 mol) isophthalic acid, and 0.6 g (500 ppm) butylstannoic acid. The mixture was heated from 25° C. to 150° C. over a period of 125 minutes under a nitrogen flow of 0.8 standard cubic feet per hour and intermittent stirring. The reaction temperature was then increased from 150° C. to 180° C. over a time period of 60 minutes and held for 30 minutes. The reaction temperature was increased from 180° C. to 200° C. over a time period of 150 minutes. The reaction was held at 200° C. for 397 minutes reaching an acid number of 5.1 mg KOH/g resin. The $1^{st}$ stage reaction mixture was cooled to 140° C. was cooled to 140° C. and 256.65 g (2.62 mol) of maleic anhydride added. The temperature increased to approximately 160° C. as a result of the anhydride exotherm. The temperature was allowed to return to 140° C. and the temperature increased from 140 to 200° C. over 60 minutes. The resin was processed for 527 minutes at 200° C. to an acid number of 15 mg KOH/g resin. The resulting resin was cooled to 140° C. and diluted to 55 wt % solids with styrene. A 0.32 g portion of hydroquinone was added to the resin solution giving a hydroquinone concentration of approximately 150 ppm. The neat resin had the following properties prior to dilution with styrene:

| Property | Value |
| --- | --- |
| Acid Number | 15 |
| ICI Viscosity @ 175° C. (poise) | 59 |
| MW (number average) | 3341 |
| MW (weight average) | 8179 |
| Tg, ° C. ($2^{nd}$ Heat Midpoint) | 53 |
| Resin Solution Appearance (55% resin in styrene) | Clear |

Example 6

The same reactor set-up used for Comparative Example 4 was used for Example 6. A 2000-ml kettle type reaction flask was charged with the following materials: 495.55 g (3.44 mol) 2,2,4,4-tertamethyl-1,3-cyclobutanediol, 117.43 g (1.13 mol) 2,2-dimethyl-1,3-propanediol, 60.67 g (0.80 mol) 1,2-propanediol, 417.78 (2.51 mol) isophthalic acid, and 0.6 g (500 ppm) butylstannoic acid. The mixture was heated from 25° C. to 150° C. over a period of 125 minutes under a nitrogen flow of 0.8 standard cubic feet per hour and intermittent stirring. The reaction temperature was then increased from 150° C. to 180° C. over a time period of 60 minutes and held for 30 minutes. The reaction temperature was increased from 180° C. to 200° C. over a time period of 150 minutes. The reaction was held at 200° C. for 400 minutes reaching an acid number of 4.8 mg KOH/g resin. The $1^{st}$ stage reaction mixture was cooled to 140° C. was cooled to 140° C. and 246.57 g (2.51 mol) of maleic anhydride added. The temperature increased to approximately 160° C. as a result of the anhydride exotherm. The temperature was allowed to return to 140° C. and the temperature increased from 140 to 200° C. over 60 minutes. The resin was processed for 600 minutes at 200° C. to an acid number of 15.4. The resin was cooled to 160° C. and due to the high viscosity, transferred to a container without dilution with styrene. A 55 wt % polyester solution in styrene was prepared by dissolving 825.0 g resin in 675.0 g styrene along with 0.225 g hydroquinone resulting in a final resin solution containing 150 ppm hydroquinone. The neat resin had the following properties prior to dilution with styrene:

| Property | Value |
| --- | --- |
| Acid Number | 15 |
| ICI Viscosity @ 175° C. (poise) | 68 |
| MW (number average) | 2739 |
| MW (weight average) | 6767 |
| Tg, ° C. ($2^{nd}$ Heat Midpoint) | 61 |
| Resin Solution Appearance (55% resin in styrene) | Clear |

Example 7

The same reactor set-up used for the Comparative Example 4 was used for Example 7. A 2000-ml kettle type reaction flask was charged with the following materials: 619.23 g (4.29 mol) 2,2,4,4-tertamethyl-1,3-cyclobutanediol, 79.29 g (1.04 mol) 1,2-propanediol, 407.59 g (2.45 mol) isophthalic acid, and 0.6 g (500 ppm) butylstannoic acid. The mixture was heated from 25° C. to 150° C. over a period of 125 minutes under a nitrogen flow of 0.8 standard cubic feet per hour and intermittent stirring. The reaction temperature was then increased from 150° C. to 180° C. over a time period of 60 minutes and held for 30 minutes. The reaction temperature was increased from 180° C. to 200° C. over a time period of 150 minutes. The reaction was held at 200° C. for 350 minutes reaching an acid number of 4.1 mg KOH/g resin. The $1^{st}$ stage reaction mixture was cooled to 140° C. was cooled to 140° C. and 240.56 g (2.45 mol) of maleic anhydride added. The temperature increased to approximately 160° C. as a result of the anhydride exotherm. The temperature was allowed to return to 140° C. and the temperature increased from 140 to 200° C. over 60 minutes. The resin was processed for 410 minutes at 200° C. to an acid number of 24. The resin was cooled to 160° C. and due to the high viscosity, transferred to a container without dilution with styrene. A 55 wt % polyester solution in styrene was prepared by dissolving 825.0 g resin in 675.0 g styrene along with 0.225 g hydroquinone resulting in a final resin solution containing 150 ppm hydroquinone. The neat resin had the following properties prior to dilution with styrene:

| Property | Value |
|---|---|
| Acid Number | 24 |
| ICI Viscosity @ 200° C. (poise) | 31 |
| MW (number average) | 2630 |
| MW (weight average) | 6306 |
| Tg, ° C. ($2^{nd}$ Heat Midpoint) | 75 |
| Resin Solution Appearance (55% resin in styrene) | Clear |

Example 8

The same reactor set-up used for the Comparative Example 4 was used for Example 8. A 2000-ml kettle type reaction flask was charged with the following materials: 500.29 g (3.47 mol) 2,2,4,4-tertamethyl-1,3-cyclobutanediol, 162.13 g (2.13 mol) 1,2-propanediol, 433.38 (2.61 mol) isophthalic acid, and 0.6 g (500 ppm) butylstannoic acid. The mixture was heated from 25° C. to 150° C. over a period of 125 minutes under a nitrogen flow of 0.8 standard cubic feet per hour and intermittent stirring. The reaction temperature was then increased from 150° C. to 180° C. over a time period of 60 minutes and held for 30 minutes. The reaction temperature was increased from 180° C. to 200° C. over a time period of 150 minutes. The reaction was held at 200° C. for 355 minutes reaching an acid number of 7.4 mg KOH/g resin. The $1^{st}$ stage reaction mixture was cooled to 140° C. was cooled to 140° C. and 255.78 g (2.61 mol) of maleic anhydride added. The temperature increased to approximately 160° C. as a result of the anhydride exotherm. The temperature was allowed to return to 140° C. and the temperature increased from 140 to 200° C. over 60 minutes. The resin was processed for 613 minutes at 200° C. to an acid number of 33. The resin was cooled to 160° C. and due to the high viscosity, transferred to a container without dilution with styrene. A 55 wt % polyester solution in styrene was prepared by dissolving 825.0 g resin in 675.0 g styrene along with 0.225 g hydroquinone resulting in a final resin solution containing 150 ppm hydroquinone. The neat resin had the following properties prior to dilution with styrene:

| Property | Value |
|---|---|
| Acid Number | 22 |
| ICI Viscosity @ 200° C. (poise) | 27 |
| MW (number average) | 2621 |
| MW (weight average) | 7293 |
| Tg, ° C. ($2^{nd}$ Heat Midpoint) | 70 |
| Resin Solution Appearance (55% resin in styrene) | hazy |

Preparation and Physical Properties of Resin Castings—Resin castings (⅛") for flexural mechanical testing and heat deflection temperature were prepared for the resins of Comparative Examples 4-6 and Examples 4-8 by catalyzing a 55 weight percent resin in styrene solution using the cure package below. The catalyzed resin is transferred to a mold. After curing overnight, castings were post cured at 120° C. for two hours. Resin properties are shown in Table 3.

| Cure Package | |
|---|---|
| Ingredients | Weight, grams |
| Resin (55% in styrene) | 200.00 |
| Cobalt octoate, 6% active | 0.80 |
| Dimethyl acetoacetamide (DMAA) copromoter | 0.60 |
| Hydroquinone inhibitor | 0.02 |
| Methyl ethyl ketone peroxide (MEKP-925) | 2.00 |

TABLE 3

Mechanical Properties of Resin Castings

| Property | Resin CE 4 | Resin CE 5 | Resin CE 6 | Resin Ex 4 | Resin Ex 5 | Resin Ex 6 | Resin Ex 7 | Resin Ex 8 |
|---|---|---|---|---|---|---|---|---|
| Heat Deflection Temperature, ° C. | 94 | 128 | ND[1] | 96 | 107 | 130 | 146 | ND[1] |
| Resin Tg, $2^{nd}$ Heat Midpoint | 31 | 118 | 47 | 36 | 53 | 60 | 75 | 61 |
| Fumarate Level, % | 82 | 78 | 65 | 85 | 86 | 86 | 86 | 94 |

[1]Not Determined - Resin casting not prepared due to poor resin solubility and/or viscosity limitations Preparation and Weathering Properties of Gel Coat Formulation—Gel coat formulations were prepared from the resins of Comparative Examples 4-6 and Examples 4-8. Pigment grinds were prepared using a high-speed toothed blade disperser and had the following formulation:

| Gel Coat Grind | |
|---|---|
| Ingredient | Weight, grams |
| Resin (55% in styrene) | 53.28 |
| Titanium dioxide grade R-902 | 79.92 |
| Additional resin (55% in styrene) | 260.80 |
| Amorphous fumed silica type M-5 | 6.00 |

The pigment was added slowly to the initial resin charge under low shear. Once all the pigment was added, shear was increased and the grind processed at a tip speed of approximately 10.7 meters/second. After 5 minutes, the grind reached a Hegman Fineness of Grind reading of >7. The remaining letdown resin was added to the pigment grind under low shear. The fumed silica was added slowly under low shear and then processed at 10.7 m/s for 5 minutes maintaining a Hegman Fineness of Grind reading of >7. The gel coat was formulated as follows:

| Gel Coat Formulation | |
| --- | --- |
| Ingredient | Weight, grams |
| Gel coat grind | 110.00 |
| Cobalt octoate, 6% active | 0.44 |
| Air release additive type BYK A-500 | 0.28 |
| Dimethyl acetoacetamide (DMAA) copromoter | 0.33 |
| Hydroquinone inhibitor | 0.01 |
| Methyl ethyl ketone peroxide (MEKP-925) | 1.10 |

Gel coat laminates were post cured at 66° C. for 2 hours prior to boiling water resistance testing. The results of the test are shown in Table 4.

TABLE 4

Blister Resistance and Moisture Uptake Properties of Prepared Gel Coat Resins After 200 hrs Exposure in Distilled Water at 100° C.

| Property | Resin CE 4 | Resin CE 5 | Resin CE 6 | Resin Ex 4 | Resin Ex 5 | Resin Ex 6 | Resin Ex 7 | Resin Ex 8 |
| --- | --- | --- | --- | --- | --- | --- | --- | --- |
| Blister Resistance, ASTM D 714 | | | | | | | | |
| Blister Size | 2 | 0 | 8 | 2 | 2 | 4 | 0 | 2 |
| Blister Frequency | 3 | 0 | 3 | 4 | 3 | 1 | 0 | 3 |
| Percent Moisture Uptake | 0.92 | 0.81 | 0.83 | 1.19 | 1.05 | 0.93 | 0.89 | 1.03 |

Examples 9-12

Preparation of unsaturated TMCD resins without 1,2-propanediol—The same reactor set-up used for Comparative Example 1 was used for Examples 9-12. A hydroxyl/acid R value of 1.05 was used for Example 9-12. A 2000-ml kettle type reaction flask was charged with the glycol and diacid types as listed in Table 5 except for the maleic anhydride. The mixture was heated from 25° C. to 150° C. over a period of 125 minutes under a nitrogen flow of 0.8 standard cubic feet per hour and intermittent stirring. The reaction temperature was then increased from 150° C. to 180° C. over a time period of 60 minutes and held for 30 minutes. The reaction temperature was increased from 180° C. to 200° C. over a time period of 150 minutes. The reaction was held at 200° C. until an acid number of less than 5 mg KOH/g resin was reached. The 1$^{st}$ stage reaction mixture was cooled to 140° C. and maleic anhydride added. The temperature increased to approximately 160° C. as a result of the anhydride exotherm. The temperature was allowed to return to 140° C. and the temperature increased from 140 to 200° C. over 60 minutes. The resin was processed at 200° C. until an acid number of 18-35 mg KOH/g resin was reached. The resin was cooled to 160° C. and due to the high viscosity, transferred to a container without dilution with styrene. A 55 wt % polyester solution in styrene was prepared by dissolving 825.0 g resin in 675.0 g styrene along with 0.225 g hydroquinone resulting in a final resin solution containing 150 ppm hydroquinone. In Tables 5-7, the label "AN" is for acid number in mg KOH/g resin, "Mw" is weight-averaged molecular weight, and "Mn" is number-averaged molecular weight. The remaining labels are self explanatory.

Examples 13-15

Preparation of unsaturated TMCD resins without 1,2-propanediol with butylstannoic acid catalyst—The same reactor set-up used for Comparative Example 1 was used for Examples 13-15. A hydroxyl/acid R value of 1.05 was used for Examples 13-15. A 2000-ml kettle type reaction flask was charged with the glycol and diacid types at the molar ratios as listed in Table 6 except for the maleic anhydride. Butylstannoic acid was used as a catalyst at 0.05 Wt. % in Examples 13-14 and at 0.10 Wt. % in Example 15. The mixture was heated from 25° C. to 150° C. over a period of 125 minutes under a nitrogen flow of 0.8 standard cubic feet per hour and intermittent stirring. The reaction temperature was then increased from 150° C. to 180° C. over a time period of 60 minutes and held for 30 minutes. The reaction temperature was increased from 180° C. to 200° C. over a time period of 150 minutes. The reaction was held at 200° C. until an acid number of less than 5 mg KOH/g resin was reached. The 1$^{st}$ stage reaction mixture was cooled to 140° C. and maleic anhydride added. The temperature increased to approximately 160° C. as a result of the anhydride exotherm. The temperature was allowed to return to 140° C. and the temperature increased from 140 to 200° C. over 60 minutes. The resin was processed at 200° C. until an acid number of 18-35 mg KOH/g resin was reached. The resin was cooled to 160° C. and due to the high viscosity, transferred to a container without dilution with styrene. A 55 wt % polyester solution in styrene was prepared by dissolving 825.0 g resin in 675.0 g styrene along with 0.225 g hydroquinone resulting in a final resin solution containing 150 ppm hydroquinone.

Examples 16-18

Preparation of unsaturated TMCD resins with 1,2-propanediol and butylstannoic acid catalyst—The same reactor set-up used for Comparative Example 1 was used for Examples 16-18. A hydroxyl/acid R value of 1.05 was used for Examples 16-18. Butylstannoic acid was used as a catalyst at 0.05 Wt. % for Examples 16-18. A 2000-ml kettle type reaction flask was charged with the glycol and diacid types at the molar ratios as listed in Table 7 except for the maleic anhydride. The mixture was heated from 25° C. to 150° C. over a period of 125 minutes under a nitrogen flow of 0.8 standard cubic feet per hour and intermittent stirring. The reaction temperature was then increased from 150° C. to 180° C. over a time period of 60 minutes and held for 30 minutes. The reaction temperature was increased from 180° C. to 200° C. over a time period of 150 minutes. The reaction was held at 200° C. until an acid number of less than 5 mg KOH/g resin was reached. The 1$^{st}$ stage reaction mixture was cooled to 140° C. and maleic anhydride added. The temperature increased to approximately 160° C. as a result of the anhydride exotherm. The temperature was allowed to return to 140° C. and the temperature increased from 140 to 200° C. over 60 minutes. The resin was processed at 200° C. until an acid number of 18-35 mg KOH/g resin was reached. The resin was cooled to 160° C. and due to the high viscosity, transferred to a container without dilution with styrene. A 55 wt % polyester solution in styrene was prepared by dissolving 825.0 g resin in 675.0 g styrene along with 0.225 g hydroquinone resulting in a final resin solution containing 150 ppm hydroquinone.

TABLE 5

Resins Prepared without 1,2-Propanediol (No Catalyst)

| Ex | Diols (mole %) | Diacids (mole %) | AN[a] | ICI @ 200° C. (Poise) | Mw (da) | Mn (da) | Tg (° C.) | % TMCD Decomp[b] |
|---|---|---|---|---|---|---|---|---|
| 9 | 80 NPG 20 TMCD | 100 PIA 1:1 PIA:MA | 18 | 10 | 9171 | 3166 | 43 | 12.5 |
| 10 | 50 NPG 50 TMCD | 100 PIA 1:1 PIA:MA | 25 | 37 | 9783 | 3361 | 58 | 9.4 |
| 11 | 20 NPG 80 TMCD | 100 PIA 1:1 PIA:MA | 35 | 77 | 8970 | 3103 | 78 | 7.9 |
| 12 | 75 NPG 25 TMCD | 100 PIA 1:1 PIA:MA | 33 | 50 | 10091 | 3485 | 43 | 20.2 |
| | Average: | | 28 | 43 | 9503 | 3278 | 56 | 12.5 |

[a] mg KOH/g resin
[b] wt. organic decomposition/TMCD charge wt

TABLE 6

Resins Prepared without 1,2-Propanediol (Butylstannoic acid catalyst)

| Ex | Diols (mole %) | Diacids (mole %) | AN[a] | ICI @175° C. (Poise) | Mw (da) | Mn (da) | Tg (° C.) | Catalyst Wt % | % TMCD Decomp[b] |
|---|---|---|---|---|---|---|---|---|---|
| 13 | 75 NPG 25 TMCD | 100 PIA 1:1 PIA:MA | 13 | 35.8 | 9150 | 3314 | 40 | 0.05 | 5.3 |
| 14 | 50 NPG 50 TMCD | 100 PIA 1:1 PIA:MA | 29 | 17 | 7985 | 3083 | 55 | 0.05 | 1.0 |
| 15 | 20 NPG 80 TMCD | 100 PIA 1:1 PIA:MA | 21 | >100 | 10036 | 3446 | 75 | 0.10 | 1.5 |
| | Average: | | 21 | 51 | 9057 | 3281 | 57 | | 2.6 |

[a] mg KOH/g resin
[b] wt. organic decomposition/TMCD charge wt

TABLE 7

Resins Prepared with Propanediol (Butylstannoic acid catalyst)

| Ex | Diols (mole %) | Diacids (mole %) | AN[a] | ICI @175° C. (Poise) | Mw (da) | Mn (da) | Tg (° C.) | Catalyst Wt % | % TMCD Decomp[b] |
|---|---|---|---|---|---|---|---|---|---|
| 16 | 64 NPG 21 TMCD 15 PG | 100 PIA 1:1 PIA:MA | 20 | 16 | 9897 | 2491 | 36 | 0.05 | 2.3 |
| 17 | 42.5 NPG 42.5 TMCD 15 PG | 100 PIA 1:1 PIA:MA | 15 | 59 | 8179 | 3341 | 53 | 0.05 | 1.5 |
| 18 | 21 NPG 64 TMCD 15 PG | 100 PIA 1:1 PIA:MA | 15 | 69 | 6767 | 2739 | 61 | 0.05 | 0.6 |
| | Average: | | 17 | 48 | 8281 | 2857 | 50 | | 1.5 |

[a] mg KOH/g resin
[b] wt. organic decomposition/TMCD charge wt

We claim:

1. An unsaturated polyester resin, comprising:
   A. diacid residues comprising about 10 to about 90 mole percent of the residues of at least one diacid chosen from 1,4-cyclohexanedicarboxylic acid, 1,2-hexahydrophthalic acid, isophthalic acid, terephthalic acid, phthalic acid, and 1,3-cyclohexanedicarboxylic acid, based on the total moles of diacid residues, and about 90 to about 10 mole percent of the residues of 2-butenedioic acid; and
   B. diol residues comprising about 20 to about 90 mole percent of the residues of 2,2,4,4-tetramethyl-1,3-cyclobutanediol and about 80 to about 10 mole percent of the residues of 1,2-propanediol, based on the total moles of diol residues;
wherein said polyester has a number average molecular weight of about 300 to about 10,000 daltons; a glass transition temperature of about 0 to about 125° C.; an acid number of 0 to about 50 mg KOH/g of polyester resin; and an ICI viscosity of about 5 to about 70 poise at a temperature of 175 to 200° C.

2. The unsaturated polyester resin according to claim 1 wherein said diacid residues comprise about 30 to about 70 mole percent of the residues of at least one diacid chosen from 1,4-cyclohexanedicarboxylic acid, 1,2-hexahydrophthalic acid, isophthalic acid, terephthalic acid, phthalic acid, and 1,3-cyclohexanedicarboxylic acid, and about 70 to about 30 mole percent of the residues of 2-butenedioic acid; and said diol residues comprise about 40 to about 90 mole percent of the residues of 2,2,4,4-tetramethyl-1,3-cyclobutanediol and about 60 to about 10 mole percent of the residues of 1,2-propanediol.

3. The unsaturated polyester resin according to claim 2 wherein said diacid residues comprise the residues of at least one diacid selected from 1,4-cyclohexane-dicarboxylic acid and isophthalic acid; and said polyester has a number average molecular weight of about 1500 to about 5000 daltons and a glass transition temperature of about 25 to about 80° C.

4. The unsaturated polyester resin according to claim 3 wherein said diacid residues comprise about 40 to about 60 mole percent of the residues of 1,4-cyclohexane-dicarboxylic acid or isophthalic acid and about 60 to about 40 mole percent of the residues of 2-butenedioic acid; said diol residues comprise about 60 to about 85 mole percent of the residues of 2,2,4,4-tetramethyl-1,3-cyclobutanediol and about 40 to about 15 mole percent of the residues of 1,2-propanediol; and said polyester has a number average molecular weight of about 2000 to about 4500 daltons and a glass transition temperature of about 50 to about 80° C.

5. The unsaturated polyester resin according to claim 1 wherein said diol residues further comprise from 0 to about 60 mole percent of the residues of at least one diol chosen from 2,2-dimethyl-1,3-propanediol, 2-methyl-1,3-propanediol, 1,4-cyclohexanedimethanol, 1,3-cyclohexanedimethanol, 1,2-cyclohexanedimethanol, ethylene glycol, diethylene glycol, triethylene glycol, tetraethylene glycol, pentaethylene glycol, hexaethylene glycol, heptaethylene glycol, octaethylene glycol, nonaethylene glycol, decaethylene glycol, 1,3-propanediol, 2,4-dimethyl-2-ethyl-hexane-1,3-diol, 2-butyl-2-ethyl-1,3-propanediol, 2-ethyl-2-isobutyl-1,3-propanediol, 1,3-butanediol, 1,4-butanediol, 1,5-pentanediol, 1,6-hexanediol, 2,2,4-tetramethyl-1,6-hexanediol, thiodiethanol, 2,2,4-trimethyl 1,3-pentanediol, p-xylenediol, hydroxypivalyl hydroxypivalate, 1,10-decanediol, and hydrogenated bisphenol A.

6. A process for the preparation of an unsaturated polyester resin, comprising
I. heating a mixture comprising:
A. a diacid component comprising about 10 to about 90 mole percent of at least one diacid chosen from 1,4-cyclohexanedicarboxylic acid, 1,2-hexahydrophthalic acid, isophthalic acid, terephthalic acid, phthalic acid, and 1,3-cyclohexanedicarboxylic acid, based on the total moles of diacid in steps I and II; and
B. a diol component comprising about 20 to about 90 mole percent of 2,2,4,4-tetramethyl-1,3-cyclobutanediol and about 80 to about 10 mole percent of 1,2-propanediol, based on the total moles of diol;
while removing the water of esterification to form an intermediate polymerization product; and
II. heating said intermediate polymerization product and about 90 to about 10 mole percent of one or more of a 2-butenedioic acid, an ester thereof, or an anhydride thereof, based on the total moles of diacid in steps I and II, while removing the water of esterification to form an unsaturated polyester resin,
wherein said unsaturated polyester resin has a number average molecular weight of about 300 to about 10,000 daltons; a glass transition temperature of about 0 to about 125° C.; an acid number of 0 to about 50 mg KOH/g of polyester resin; and a ICI viscosity of about 5 to about 70 poise at a temperature of 175 to 200° C.

7. The process according to claim 6 wherein said diacid component comprises about 30 to about 70 mole percent of at least one diacid chosen from 1,4-cyclohexanedicarboxylic acid, 1,2-hexahydrophthalic acid, isophthalic acid, terephthalic acid, phthalic acid, and 1,3-cyclohexanedicarboxylic acid; said diol component comprises about 40 to about 90 mole percent of 2,2,4,4-tetramethyl-1,3-cyclobutanediol and about 60 to about 10 mole percent of 1,2-propanediol; and said intermediate polymerization product in step 11 is heated with about 70 to about 30 mole percent of one or more of said 2-butenedioic acid, an ester thereof, or an anhydride thereof.

8. The process according to claim 7 wherein said diacid component comprises about 40 to about 60 mole percent of 1,4-cyclohexanedicarboxylic acid or isophthalic acid; said diol component comprises about 60 to about 85 mole percent of 2,2,4,4-tetramethyl-1,3-cyclobutanediol and about 40 to about 15 mole percent of 1,2-propanediol; said intermediate polymerization product in step II is heated with about 60 to about 40 mole percent of one or more of said 2-butenedioic acid, an ester thereof, or an anhydride thereof; and said polyester resin has a number average molecular weight of about 2000 to about 4500 daltons and a glass transition temperature of about 50 to about 80° C.

9. A curable, unsaturated polyester composition comprising:
I. an unsaturated polyester resin, comprising:
A. diacid residues comprising about 10 to about 90 mole percent of the residues of at least one diacid chosen from 1,4-cyclohexanedicarboxylic acid, 1,2-hexahydrophthalic acid, isophthalic acid, terephthalic acid, phthalic acid, and 1,3-cyclohexanedicarboxylic acid, based on the total moles of diacid residues, and about 90 to about 10 mole percent of the residues of 2-butenedioic acid; and
B. diol residues comprising about 20 to about 90 mole percent of the residues of 2,2,4,4-tetramethyl-1,3-cyclobutanediol and about 80 to about 10 mole percent of the residues of 1,2-propanediol, based on the total moles of diol residues;
wherein said polyester has a number average molecular weight of about 300 to about 10,000 daltons; a glass transition temperature of about 0 to about 125° C.; an acid number of 0 to about 15 mg KOH/g of polyester resin; and a ICI viscosity of about 5 to about 70 poise at a temperature of 175 to 200° C.; and
II. an ethylenically unsaturated monomer copolymerizable with said unsaturated polyester resin.

10. The unsaturated polyester composition according to claim 9 wherein said ethylenically unsaturated monomer comprises styrene, vinyl toluene, methyl (meth)acrylate, α-methyl styrene, or combinations thereof.

11. The unsaturated polyester composition according to claim 10 wherein said diacid residues comprise about 30 to about 70 mole percent of the residues of at least one diacid chosen from 1,4-cyclohexanedicarboxylic acid, 1,2-hexahydrophthalic acid, isophthalic acid, terephthalic acid, phthalic acid, and 1,3-cyclohexanedicarboxylic acid, based on the total moles of diacid residues, and about 70 to about 30 mole percent of the residues of 2-butenedioic acid; and said diol residues comprise about 40 to about 90 mole percent of the residues of 2,2,4,4-tetramethyl-1,3-cyclobutanediol and about 60 to about 10 mole percent of the residues of 1,2-propanediol.

12. The unsaturated polyester composition according to claim 11 wherein said diacid residues comprise the residues of at least one diacid selected from 1,4-cyclohexanedicarboxylic acid and isophthalic acid; and said polyester resin has a number average molecular weight of about 1500 to about 5000 daltons and a glass transition temperature of about 25 to about 80° C.

13. The unsaturated polyester composition according to claim 12 wherein said diacid residues comprise about 40 to about 60 mole percent of the residues of 1,4-cyclohexanedicarboxylic acid or isophthalic acid and about 60 to about 40 mole percent of the residues of 2-butenedioic acid; said diol residues comprise about 60 to about 85 mole percent of the residues of 2,2,4,4-tetramethyl-1,3-cyclobutanediol and about 40 to about 15 mole percent of the residues of 1,2-propanediol; and said polyester resin has a number average molecular weight of about 2000 to about 4500 daltons and a glass transition temperature of about 50 to about 80° C.

14. The unsaturated polyester composition according to claim 9 wherein said diol residues further comprise from 0 to about 60 mole percent of the residues of at least one diol chosen from 2,2-dimethyl-1,3-propanediol, 2-methyl-1,3-propanediol, 1,4-cyclohexanedimethanol, 1,3-cyclohexanedimethanol, 1,2-cyclohexanedimethanol, ethylene glycol, diethylene glycol, triethylene glycol, tetraethylene glycol, pentaethylene glycol, hexaethylene glycol, heptaethylene glycol, octaethylene glycol, nonaethylene glycol, decaethylene glycol, 1,3-propanediol, 2,4-dimethyl-2-ethyl-hexane-1,3-diol, 2-butyl-2-ethyl-1,3-propanediol, 2-ethyl-2-isobutyl-1,3-propanediol, 1,3-butanediol, 1,4-butanediol, 1,5-pentanediol, 1,6-hexanediol, 2,2,4-tetramethyl-1,6-hexanediol, thiodiethanol, 2,2,4-trimethyl 1,3-pentanediol, p-xylenediol, hydroxypivalyl hydroxypivalate, 1,10-decanediol and hydrogenated bisphenol A.

15. A coating obtained upon the polymerization of the curable, unsaturated polyester composition defined in claim 9.

16. A coating obtained upon the polymerization of the curable, unsaturated polyester composition defined in claim 12.

17. A casted or molded article obtained upon the polymerization of the curable, unsaturated polyester composition defined in claim 9.

18. A casted or molded article obtained upon the polymerization of the curable, unsaturated polyester composition defined in claim 12.

19. The casted or molded article according to claim 17 which has at least one surface that is persistently exposed to organic or aqueous liquids.

20. The casted or molded article according to claim 19 that is a boat hull, bathtub, unit bath, wash stand, tank, pipe, swimming pool wall, or kitchen utensil.

* * * * *